United States Patent [19]

Hendricks et al.

[11] Patent Number: 5,682,195
[45] Date of Patent: Oct. 28, 1997

[54] DIGITAL CABLE HEADEND FOR CABLE TELEVISION DELIVERY SYSTEM

[75] Inventors: John S. Hendricks, Potomac; Alfred E. Bonner, Bethesda, both of Md.; John P. Lappington, Lawrenceville; Richard E. Wunderlich, Alpharetta, both of Ga.

[73] Assignee: Discovery Communications, Inc., Bethesda, Md.

[21] Appl. No.: 160,283

[22] Filed: Dec. 2, 1993

Related U.S. Application Data

[63] Continuation-in-part of Ser. No. 991,074, Dec. 9, 1992.

[51] Int. Cl.[6] .................................................. H04N 7/16
[52] U.S. Cl. .................. 348/6; 348/12; 455/5.1; 455/6.1
[58] Field of Search ........................ 348/6, 9, 7, 12, 348/13, 14, 15, 16, 17, 18; 455/3.1, 4.2, 5.1, 6.2, 6.1; 380/5, 7, 10, 20; 370/124, 73, 71, 112, 85.1, 85.7, 85.6; H04N 7/16, 7/173

[56] References Cited

U.S. PATENT DOCUMENTS

| | | |
|---|---|---|
| 3,891,792 | 6/1975 | Kimura . |
| 4,361,848 | 11/1982 | Poignet et al. . |
| 4,488,179 | 12/1984 | Kruger et al. . |
| 4,517,598 | 5/1985 | Van Valkenburg et al. . |
| 4,587,520 | 5/1986 | Astle . |

(List continued on next page.)

FOREIGN PATENT DOCUMENTS

| | | |
|---|---|---|
| 2044574 | 12/1992 | Canada . |
| 103438 | 3/1984 | European Pat. Off. . |
| 145063 | 6/1985 | European Pat. Off. . |
| 149536 | 7/1985 | European Pat. Off. . |
| 158548 | 10/1985 | European Pat. Off. . |
| 167237 | 1/1986 | European Pat. Off. . |
| 243312 | 10/1987 | European Pat. Off. . |
| 355697 | 2/1990 | European Pat. Off. . |
| 425834 | 5/1991 | European Pat. Off. . |
| 506435 | 9/1992 | European Pat. Off. . |
| 513763 | 11/1992 | European Pat. Off. . |
| 3423846 | 1/1986 | Germany . |

(List continued on next page.)

OTHER PUBLICATIONS

Sharpless, "Subscription Teletext for Value Added Services," 8087 IEEE, Aug. 1985, No. 3, pp. 283–289.

Henrie van den Boom: An Interactive Videotex System for Two-Way CATV Networks; AEU, Band 40; 1986; pp. 397–401.

Daniel M. Moloney: Digital Compression in Todays Addressable Environment; 1993 NCTA Technical Papers; Jun. 6, 1993; pp. 308–316.

Caitlin Bestler: Flexible Data Structures and Interface Rituals For Rapid Development of OSD Applications; 93 NCTA Tech. Papers; Jun. 6, 1993; pp. 223–226.

A.D. Gelman, et al.: A Store-And-Forward Architecture For Video–On–Demand Service; ICC 91 Conf.; Jun. 1991; pp. 842–846.

Olshansky, Subscriber Distribution Networks Using Compressed Digital Video, Journal of Lightwave Technology, Nov. 1992, pp. 1760–1765.

Dinaro/Telettra, Markets and Products Overview, Revue, 1991, pp. 135–140.

*Primary Examiner*—John K. Peng
*Assistant Examiner*—Chris Grant
*Attorney, Agent, or Firm*—Dorsey & Whitney LLP

[57] ABSTRACT

The present invention provides greater capability and flexibility than existing cable headends. Specifically, the invention comprises a modular design for a cable headend and a combiner component for cable headend. The invention is particularly useful in cable television program delivery systems transponding large numbers of digitally compressed program signals. The combiner allows cherry-picking of programs from transponded signals.

27 Claims, 18 Drawing Sheets

U.S. PATENT DOCUMENTS

| | | |
|---|---|---|
| 4,605,964 | 8/1986 | Chard . |
| 4,639,225 | 1/1987 | Washizuka . |
| 4,688,218 | 8/1987 | Blineau et al. . |
| 4,697,209 | 9/1987 | Kiewit et al. . |
| 4,724,491 | 2/1988 | Lambert . |
| 4,829,558 | 5/1989 | Welsh . |
| 4,829,569 | 5/1989 | Seth-Smith et al. . |
| 4,876,736 | 10/1989 | Kiewit . |
| 4,949,810 | 8/1990 | Darbee et al. . |
| 4,961,109 | 10/1990 | Tanaka . |
| 4,977,455 | 12/1990 | Young . |
| 5,001,554 | 3/1991 | Johnson et al. . |
| 5,014,125 | 5/1991 | Pocock et al. . |
| 5,015,829 | 5/1991 | Eilert et al. . |
| 5,036,394 | 7/1991 | Morii et al. . |
| 5,036,537 | 7/1991 | Jeffers et al. . |
| 5,047,867 | 9/1991 | Strubbe et al. . |
| 5,078,019 | 1/1992 | Aoki . |
| 5,132,789 | 7/1992 | Ammon et al. . |
| 5,132,992 | 7/1992 | Yurt et al. . |
| 5,133,079 | 7/1992 | Ballantyne et al. . |
| 5,150,118 | 9/1992 | Finkle et al. . |
| 5,151,782 | 9/1992 | Ferraro . |
| 5,151,789 | 9/1992 | Young . |
| 5,155,591 | 10/1992 | Wachob . |
| 5,166,886 | 11/1992 | Molnar et al. . |
| 5,182,639 | 1/1993 | Jutamulia et al. . |
| 5,202,817 | 4/1993 | Koenck et al. . |
| 5,206,954 | 4/1993 | Inoue et al. . |
| 5,216,515 | 6/1993 | Steele et al. . |
| 5,223,924 | 6/1993 | Strubbe . |
| 5,227,211 | 7/1993 | Mailey et al. . |
| 5,253,275 | 10/1993 | Yurt et al. . |
| 5,260,778 | 11/1993 | Kauffman et al. . |
| 5,283,639 | 2/1994 | Esch et al. . |
| 5,285,272 | 2/1994 | Bradley et al. ................ 348/6 |
| 5,289,271 | 2/1994 | Watson . |
| 5,293,540 | 3/1994 | Trani et al. . |
| 5,319,455 | 6/1994 | Hoarty et al. . |
| 5,319,707 | 6/1994 | Wasilewski et al. . |
| 5,323,240 | 6/1994 | Amano et al. . |
| 5,327,554 | 7/1994 | Palazzi, III et al. . |
| 5,339,315 | 8/1994 | Maeda et al. . |
| 5,341,474 | 8/1994 | Gelman et al. . |
| 5,343,239 | 8/1994 | Lappington et al. . |
| 5,345,594 | 9/1994 | Tsuda . |
| 5,353,121 | 10/1994 | Young et al. . |
| 5,355,162 | 10/1994 | Yazolino et al. . |
| 5,367,571 | 11/1994 | Bowen et al. . |
| 5,375,068 | 12/1994 | Palmer et al. . |
| 5,400,401 | 3/1995 | Wasilewski et al. ............ 380/20 |
| 5,404,393 | 4/1995 | Remillard . |
| 5,410,326 | 4/1995 | Goldstein . |
| 5,410,344 | 4/1995 | Graves et al. . |
| 5,412,416 | 5/1995 | Nemirofsky ..................... 348/10 |
| 5,414,426 | 5/1995 | O'Donnell et al. . |
| 5,416,508 | 5/1995 | Sakuma et al. . |
| 5,432,542 | 7/1995 | Thibadeau et al. . |
| 5,442,626 | 8/1995 | Wei ............................. 370/20 |
| 5,446,919 | 8/1995 | Wilkins ......................... 455/6.2 |
| 5,473,362 | 12/1995 | Fitzgerald et al. . |
| 5,477,263 | 12/1995 | O'Callaghan et al. . |
| 5,479,268 | 12/1995 | Young et al. . |
| 5,481,294 | 1/1996 | Thomas et al. . |
| 5,481,542 | 1/1996 | Logston et al. ................. 348/13 |
| 5,515,098 | 5/1996 | Carles . |

FOREIGN PATENT DOCUMENTS

| | | |
|---|---|---|
| 61-060150 | 3/1986 | Japan . |
| 5250106 | 9/1993 | Japan . |
| 1204190 | 9/1970 | United Kingdom . |
| 2168227 | 6/1986 | United Kingdom . |
| 9100670 | 1/1991 | WIPO . |
| 9103112 | 3/1991 | WIPO . |
| 9211713 | 7/1992 | WIPO . |
| 9212599 | 7/1992 | WIPO . |
| 9217027 | 10/1992 | WIPO . |
| 9221206 | 11/1992 | WIPO . |
| 9322877 | 11/1993 | WIPO . |

BASIC DIGITAL CABLE HEADEND

DIGITAL CABLE HEADEND FOR CABLE TELEVISION DELIVERY SYSTEM

RELATED APPLICATIONS

This application is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following other continuation-in-part applications, also based on the above-referenced patent application, are incorporated herein by reference:

Ser. No. 08/160,281, entitled REPROGRAMMABLE TERMINAL FOR SUGGESTING PROGRAMS OFFERED ON A TELEVISION PROGRAM DELIVERY SYSTEM, fried Dec. 2, 1993

Ser. No. 08/160,280, entitled NETWORK CONTROLLER FOR CABLE TELEVISION DELIVERY SYSTEMS, filed Dec. 2, 1993

Ser. No. 08/160,282, entitled AN OPERATIONS CENTER FOR A TELEVISION PROGRAM PACKAGING AND DELIVERY SYSTEM, filed Dec. 2, 1993

Ser. No. 08/160,193, entitled SET TOP TERMINAL FOR CABLE TELEVISION DELIVERY SYSTEMS, filed Dec. 2, 1993

Ser. No. 08/160,194, entitled ADVANCED SET TOP TERMINAL FOR CABLE TELEVISION DELIVERY SYSTEMS, filed Dec. 2, 1993

TECHNICAL FIELD

This invention relates to cable television delivery systems for providing television programing to consumer homes in digital format. More particularly, the invention relates to new technology for the cable headend portion of a cable television delivery system capable of handling digital video/audio signals.

BACKGROUND

Today's television delivery systems are designed to deliver analog video/audio signals from the signal source to viewer televisions. With the introduction of digital technology for video/audio, the future of television delivery systems requires conversion of the delivery systems from analog to digital video/audio.

Developments in digital bandwidth compression technology will allow for much greater throughput of television program signals over existing or slightly modified transmission media. The cable television delivery systems must be redesigned to take advantage of digital technology. The cable headend is a key part of a cable television delivery system and requires redesign.

Analog cable television delivery systems operate with an analog cable converter box in the viewer home which uses a television to display video programs. The converter box is connected via cable to a cable headend site.

Typically, each analog cable headend site has multiple satellite dishes. Each analog cable headend site's satellite dishes normally receives transponded signals from one or two satellites. A satellite has multiple satellite transponders. Although uplink sites and satellite dishes can transmit and receive multiple video/audio program signals, currently, each satellite transponder normally carries only one video/audio program at any given time. Typically, a transponder is dedicated to one channel of video programming. Further, there is generally one Integrated Receiver and Decoder per transponder (or channel) at the analog cable headend to receive the signal from the transponder.

In summary, current analog technology requires the combination of one uplink site, one satellite transponder, and one cable headend satellite dish to deliver each analog video/audio program to the cable headend. The cable headend uses several analog video/audio signals from multiple dishes and multiple transponders to provide multi-channel analog signals. The cable headend then transmits these analog signals on different transmission frequencies to the cable converter boxes in the viewer homes where one channel is selected.

Each television channel for analog video/audio transmissions for television is in a 6 MHz segment of bandwidth. An industry standard of 6 MHz was set in the year 1939 and the NTSC standard is still 6 MHz per channel of analog video. As television program delivery technology moves into the digital world the 6 MHz segments have no real technical significance, except in hybrid analog-digital converters.

In addition, today's cable television delivery systems carry signals which are scrambled for security reasons. Each vendor uses scrambling techniques that are incompatible with the every other vendor. There are two primary cable industry leaders in scrambling formats, Scientific-Atlanta, Inc. (SA), 4386 Park Drive, Norcross, Ga. 30093 and General Instrument Corporation, Gerald Communications Division (GI), 2200 Byberry Road, Hatboro, Pa. 19040.

Currently, a two step scrambling/descrambling process is used in cable television program delivery systems. During the first step, program signals are scrambled prior to satellite transmission and are descrambled at the cable headend. During the second step, program signals are transmitted in scrambled format to the viewer homes where an authorized converter box descrambles the signals. Primarily, two types of scrambling techniques are used between the cable headend and converter boxes in subscriber homes, video inversion and synch suppression. Thus, the final descrambling takes place at the converter box in the viewer homes using one of these two techniques.

General Instruments is by far the industry leader and has a virtual "lock" on the market for signal scrambling from origination point to cable headend. From the cable headend to the subscriber home, General Instruments and Scientific Atlanta have the greatest market shares, but face competition from competitors such as Zenith and Pioneer. Scientific Atlanta and General Instruments are also the primary producers of set top terminals for the U.S. cable industry. Therefore, cable headends may only service one vendor's converter boxes. Generally, cable headend scrambling equipment services either Scientific Atlanta converters or General Instruments converters. No standard scrambling or security measures have been agreed upon by the industry. In some cases, manufacturers can produce descramblers that are compatible with another's system.

Although no standard method for digital coding of moving pictures and audio has been established, the television industry through the International Organization For Standardization is working on a digital coding standard.

The use of digital video/audio signals for delivering cable television programming will require changing today's cable television delivery system. In particular, the analog cable headend described above will not operate in the digital environment. Methods of encryption and decryption also need to be examined.

What is needed is a cable headend which operates in the digital environment.

What is needed is a cable headend which can operate in both the digital and analog environment.

What is needed is a cable headend which receives multiple video/audio program signals from a single satellite transponder.

What is needed is a cable headend which can combine digital video/audio program signals for transmission to viewer homes.

What is needed is a cable headend which can send both analog and digital video/audio program signals to viewer homes.

What is needed is a cable headend which can combine selected analog and selected digital video/audio signals to be transmitted to viewer homes.

What is needed is a cable headend which can select discrete digital channels from a multiple digital channel feed and recombine the channels for transmission to the viewer home.

What is needed is a cable headend that can combine various digital video/audio signals to create tiered program offerings for viewers.

What is needed is a cable headend that can handle any necessary signal encryption or decryption.

Accordingly, there is an unanswered need for digital cable headend technology. There is a need for cable headend technology that takes advantage of digital compression techniques for video/audio program signals.

The present invention is designed to address these needs.

SUMMARY OF INVENTION

A preferred embodiment of the present invention is a digital cable headend system that allows full utilization of digital technology in a cable television delivery system. The cable headend is a key component of a digital cable television delivery system. The cable headend is the central component for receiving, combining and routing program signals to the viewer homes. The cable headend of the present invention provides much greater capability and flexibility than existing cable headends. Specifically, the Combiner, in combination with other components of the digital cable headend of the present invention, solves many technical problems and challenges.

The introduction of digital program signal technology presents several new challenges to cable television delivery systems. Digital technology will provide cable headends with hundreds of channels of programming. With this overwhelming number of programs, there must be a method of selecting or cherry-picking desired programs and/or filtering out unwanted programs received from a transponder. Also, since the programs are too numerous to pass through the limited bandwidth space in the concatenated cable to the viewer homes, the bandwidth available to homes must be effectively and efficiently managed. A limited number of programs must be selected to send to viewer homes.

In addition, the available bandwidth may differ from viewer home to viewer home. For example, a cable headend may service some cable viewers with a 550 MHz bandwidth signal (typically 50 MHz to 550 MHz) and some viewers with a 750 MHz bandwidth system. The cable headend must transmit the correct combined signal to the appropriate viewers. In a similar fashion, if concatenated cable systems with identical bandwidths require different offering of program selections, the cable headend must fashion two different combined signals with identical bandwidth, one for each concatenated cable system.

Satellite transponders act as conduits for the delivery of the digital program signals to cable headends. These satellite transponders send data in various data packet formats, at different data rates, and encrypted in one of several possible formats. Therefore, a cable headend must be able to receive, filter, combine and route signals received at different data rates for distribution to viewer homes. This requires the cable headend to delay and synchronize signals as necessary. The present invention solves these problems and others.

The cable headend also accommodates local cable and television companies with program time for local advertising and/or feature programming time availability in digital or analog form. Local digital or analog signals may be combined with satellite signals at the headend.

An important component of the new cable headend configuration is the Combiner. The basic functions of the Combiner are selecting video signals to be combined, handling video/audio signals at varying data rates (as necessary), packet switching and ensuring the integrity of the combined signal. The basic components of the preferred Combiner are a Control CPU, digital logic, and a serializer. The Control CPU in conjunction with digital logic performs the intelligent functions of the Combiner. Specifically, the Control CPU and digital logic select the video signals to be combined and ensure the integrity of the combined signal. This procedure is accomplished on the video data packet-by-packet. A variety of combinations of hardware and software may be used to perform the Combiner functions.

Combiners may be used in parallel or in series as needed to accomplish proper output of signal to set top boxes. The Combiner may be used in conjunction with various digital and analog cable headend configurations.

Four different categories of headends are described, mixed analog and digital, digital only, digital-in-analog-out, and a more complex embodiment which transmits television program information on a data signal to the set top terminal. These embodiments may each be built in a modular fashion and may service multiple concatenated cable systems having different available bandwidths.

It is an object of this invention to provide a digital cable headend for a cable television delivery system.

It is an object of this invention to provide certain needed components of a digital cable headend for use in cable television delivery systems.

It is an object of this invention to provide a versatile Combiner for a cable headend.

It is an object of this invention to provide a cable headend capable of operating in both the digital and analog environment.

It is an object of this invention to provide a cable headend capable of receiving multiple video/audio program signals from a single satellite transponder.

It is an object of this invention to provide a cable headend which routes both analog and digital video/audio program signals to viewer homes.

It is an object of this invention to provide a cable headend which can select one program from multiple video/audio programs received from a single satellite transponder.

It is an object of this invention to provide a cable headend which can filter out unselected programs from a multiple video/audio program signal.

It is an object of this invention to provide a Combiner component for a cable headend which combines digital video/audio signals and analog video/audio signals.

It is an object of this invention to provide a Combiner component for a cable headend which combines digital video/audio signals received from two different transponders.

It is an object of this invention to provide a Combiner component for a cable headend which combines digital video/audio signals of different data rates.

It is an object of this invention to provide a Combiner component for a cable headend which performs packet switching.

It is an object of this invention to provide a cable headend which combines selected analog and selected digital video/audio signals to be transmitted to viewer homes.

It is an object of this invention to provide a cable headend that creates tiered programming by combining various digital video/audio signals.

It is an object of this invention to provide a cable headend that receives a large bandwidth of video/audio programming and selects programs from among the large bandwidth to accommodate a limited bandwidth between cable headend and viewer homes.

It is an object of this invention to provide a cable headend that accommodates different bandwidth availability between cable headend and certain viewer homes.

It is an object of this invention to provide a cable headend that decrypts signals.

It is an object of this invention to provide a cable headend that encrypts signals.

It is an object of this invention to provide a cable headend that decrypts signals received in various encryption formats and encrypts all signals transmitted to viewer homes into one encryption format.

It is an object of this invention to provide a modular headend.

These and other objects and advantages of the invention will become obvious to those skilled in the art upon review of the following description, the attached drawings and appended claims.

DESCRIPTION OF THE DRAWINGS

FIG. 10b is a software flow chart of the Control Output Gates subroutine of the Control CPU software shown in FIG. 10a.

FIG. 10c is a software flow chart of the Delete Packets subroutine of the Control CPU software shown in FIG. 10a.

DETAILED DESCRIPTION OF THE PREFERRED EMBODIMENT

Figure 1:
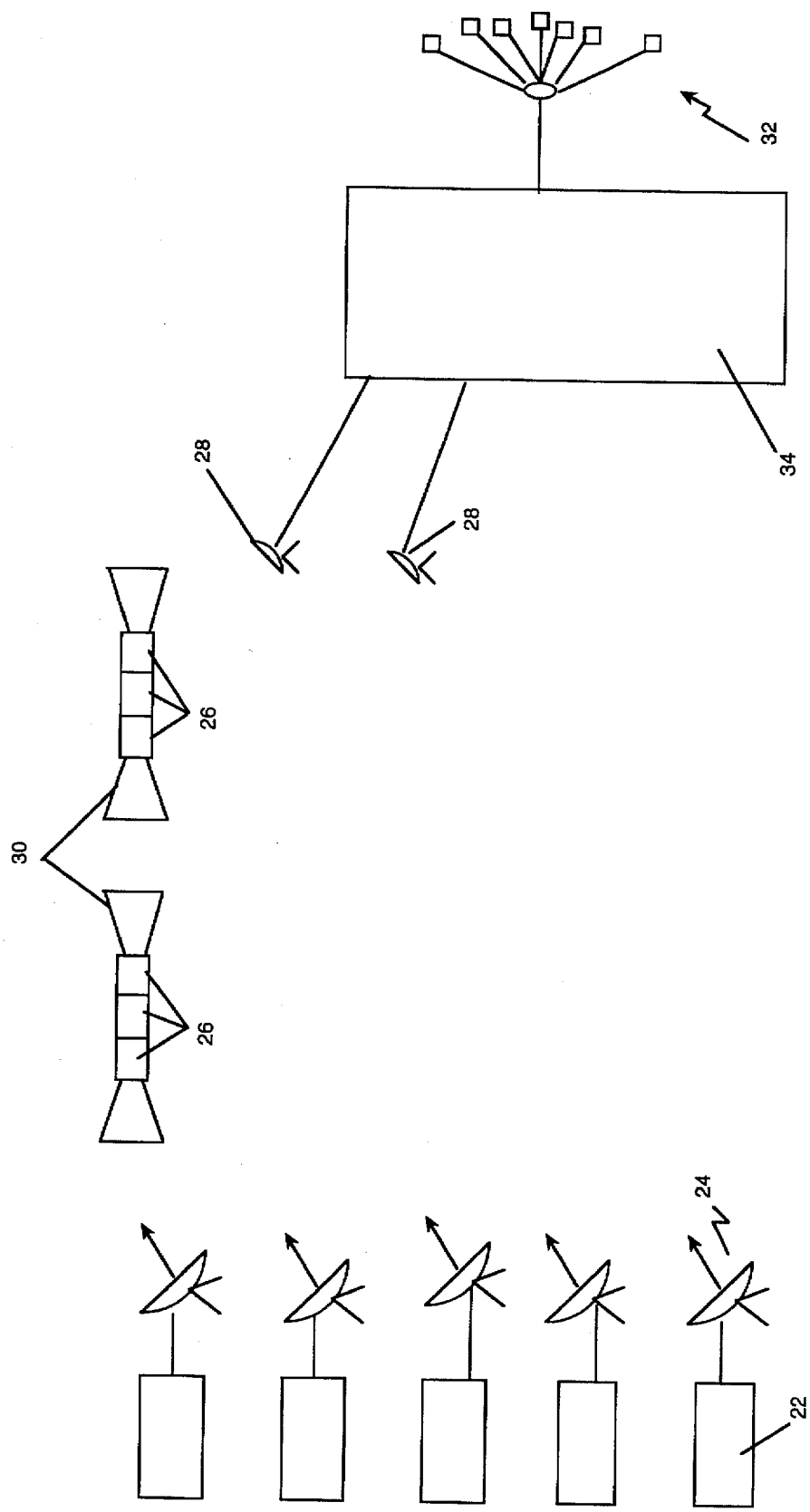
FIG. 1 is a schematic of an existing analog cable television delivery system.

FIG. 1 shows an overview of an existing analog cable television delivery system 20. FIG. 1 shows one analog television program source 22 uplinked by each satellite transmitter dish 24 to one or more satellite transponders 26, and each satellite receiver dish 28 receiving transponded signals from one satellite 30.

In analog systems of today, each satellite 30 has multiple transponders 26. Each transponder is only capable of handling a single (or in rare cases, two) analog television program at a time. The received analog television program signals are combined by the cable headend 34 and routed to the concatenated cable system 32. The one program per transponder limitation of the analog television delivery system can be eliminated with the introduction of digital technology.

Figure 2:
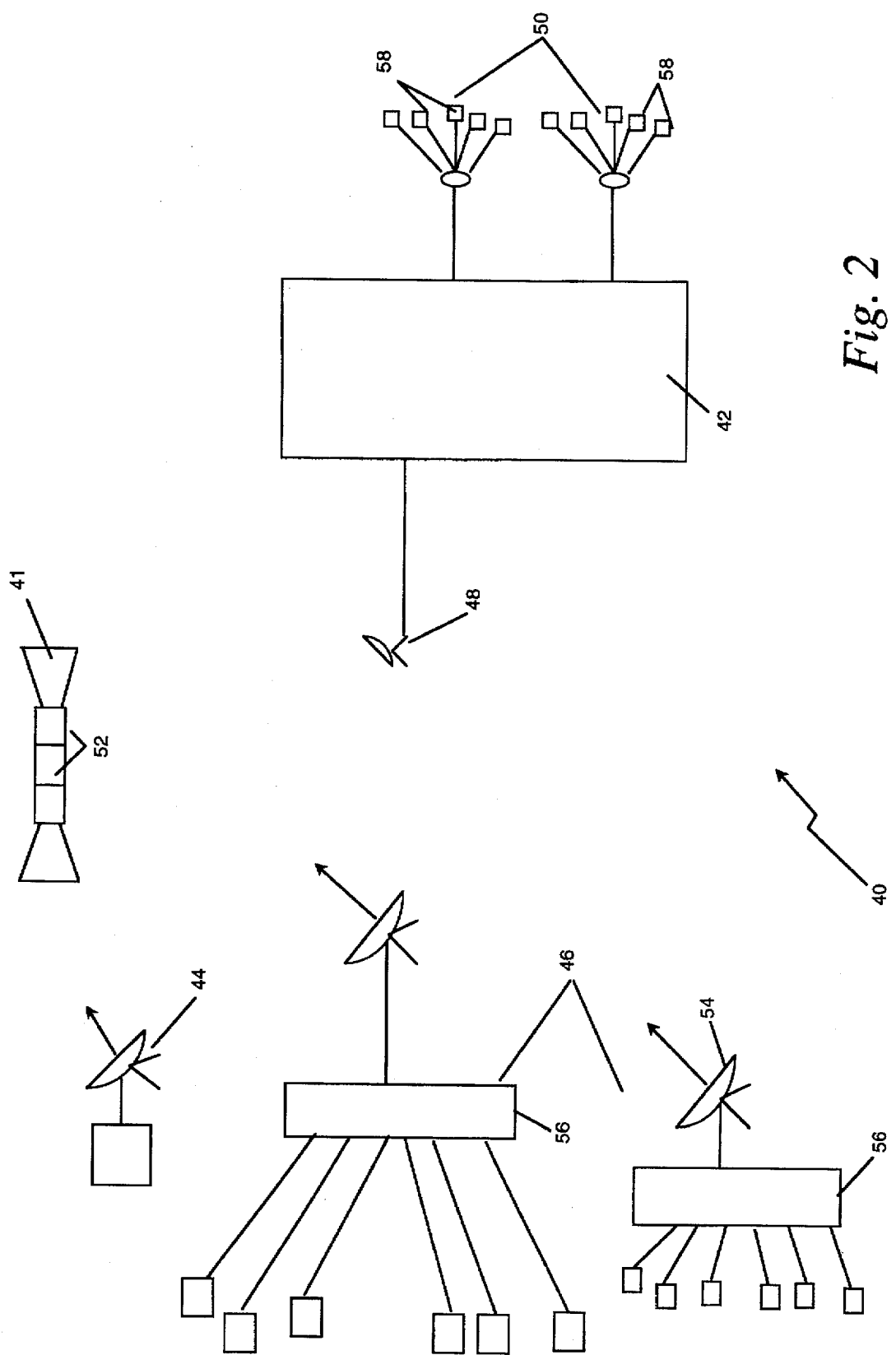
FIG. 2 is a schematic of a future digital/analog cable television delivery system.

FIG. 2 shows an overview of the digital/analog cable television delivery system 40 of the present invention. FIG. 2 shows digital and analog television program signals being uplinked to a satellite 41 and received by a cable headend 42. One analog uplink 44 and two digital uplinks 46 are shown and one receive dish 48 is shown. Two exemplary concatenated cable systems 50 are shown connected to the headend 42. Many concatenated cables may be run from the cable headend 42.

Those of ordinary skill in the art are presumed to have a familiarity with digital coding of moving pictures and associated audio. Specifically, the preferred embodiment uses the MPEG-2 standard of coding and those of ordinary skill in the art are presumed to be familiar with the MPEG-2 standard. The MPEG-2 Systems Working Draft Proposal from the Systems Committee of the International Organization For Standardization, document ISO/IEC JTC1/SC29/WG11 "N0531" MPEG93, dated Sep. 10, 1993, is hereby incorporated by reference.

The digital cable delivery system 40 of the invention generally employs digital compression techniques to increase existing satellite transponder 52 capacity by at least a 4:1 ratio, resulting in a four-fold increase in program delivery capability. Current digital compression techniques allow up to a ten-fold increase in program delivery capacity. As compression techniques improve, the ratio will increase. The input signals containing television programs are compressed, combined and encoded prior to satellite transmission, and subsequently transponded and transmitted to various receive sites. There are a number of compression algorithms that currently exist which can achieve the resultant increase in capacity and improved signal quality desired for the invention.

One of the achievements of the new system is effective utilization of digital compression technology. For example, with current digital compression techniques for video, the typical 50-channel capacity cable satellite receiving system can be increased to 300 channels. In the present analog configurations, one transponder is used for each satellite delivered channel (FIG. 1). In contrast, one embodiment (not shown) of the delivery system 40 of the present invention uses 18 satellite transponders and compression ratios of 4:1 to 8:1 to achieve a capacity of 136 satellite delivered channels. More transponders or higher compression ratios can be used to deliver up to the channel capacity of any existing cable system.

Typical program delivery first involves the digitizing of the video signals. The digitized signal can be compressed by any one of a variety of digital compression techniques that are available. Three basic types of digital compression techniques are available: within frame (intraframe) compression, frame-to-frame (interframe) compression, and within carrier compression. All of these techniques are used in the MPEG compression standard. Following compression, the channels must be multiplexed and sent to the satellite dish (e.g., the dish 54 of one of the digital uplinks 46) that will provide the uplink. A variety of multiplexing schemes may be used in the system. In some situations, it may be advantageous to use different multiplexing schemes in different parts of the overall system. For example, one multiplexing scheme may be used for satellite transmission and a second remultiplexing scheme may be used at the cable headend 42 for combining the signals for land transmission.

Once the signal has arrived at the uplink or master control site 46, it must be modulated, upconverted, and amplified. Various types of satellites and transponders 41, 52, respectively, capable of handling digital signals, may be used in this cable television packaging and delivery system 40. An example of a satellite 41 which is being used in cable television delivery systems is the AT&T Telstar 303. These satellites 41 can be used for both digital and analog program transmission.

In one embodiment, the input signals into the cable television delivery system 20 are packaged prior to uplink by an Operations Center 56 as described in the parent application, Ser. No. 07/991,074, filed Dec. 9, 1992, entitled TELEVISION PROGRAM PACKAGING AND DELIVERY SYSTEM WITH MENU DRIVEN SUBSCRIBER ACCESS, and filed by the same assignee and incorporated herein by reference. Included in the program signals, which are pre-packaged, is information which enables equipment at the subscriber's home to display menus for choosing particular programs. After packaging, the packaged television program signal is prepared for satellite transmission and sent from the Operations Center 56 to the cable headend 42 via satellite transmission.

Depending on the specific embodiment, the television program signal may need to be compressed, combined/multiplexed, encoded, mapped, modulated, upconverted and amplified. The digital cable delivery systems, which are intended to be compatible with existing C and Ku Band satellite transmission technologies, accept video, audio and data signals ranging in signal quality, and supplied from a number of sources.

Upon receipt of the programming signal at the cable headend 42, the signal is manipulated and sent into a concatenated cable system 50 to subscribers' homes. In the preferred digital embodiment, the signal reaches a subscriber's home, at a set top terminal 58, in a compressed format and must be decompressed prior to viewing. Depending on the particular embodiment, the television program signal may arrive at a subscriber's home via one or more coaxial cables, fiber cables, twisted pairs, cellular telephone connections, personal communications network (PCN) hookups or other communication media. Any of a variety of transmission means or transmitters known in the art may be used to transport the signal by way of one of the transmission media described.

The connection between a subscriber's home and the cable headend 42 may also allow for two-way communications with the cable headend 42. Utilizing this two-way communications, the cable headend 42 can receive information about a subscriber's account, billing, and programs viewed. Also, the cable headend 42 is capable of sending computer data or computer software information to a subscriber's home.

As shown in FIG. 2, an analog cable TV system 40 can continue to exist alongside and within the digitally compressed system of the present invention. The cable headend 42 may receive analog television programming via satellite 41 and/or may receive analog television programming locally.

With the cable headend 42 of the present invention, the analog television programming may be combined and transmitted to viewer homes along with digital television programming signals. The digital transmissions do not affect the analog system 40. In fact, the 6 MHz analog cable signal may be transmitted simultaneously on the same cable as the digital signal, provided two signals are transmitted using separate carrier frequencies. With the present invention, the cable headends 42 may continue to supply subscribers with local channels in an analog signal format. Alternatively, the analog signals can be digitized and digitally compressed at the cable headend 42 prior to combining. Video services may be used that accept analog feeds from around the country and "repackage" the analog feeds into digital multiplexed feeds containing multiple video channels. The cable boxes or set top terminals 58 installed in the viewer homes may be configured to accommodate digital television programming only, analog only, or both.

BANDWIDTH ALLOCATION

Figure 3A:
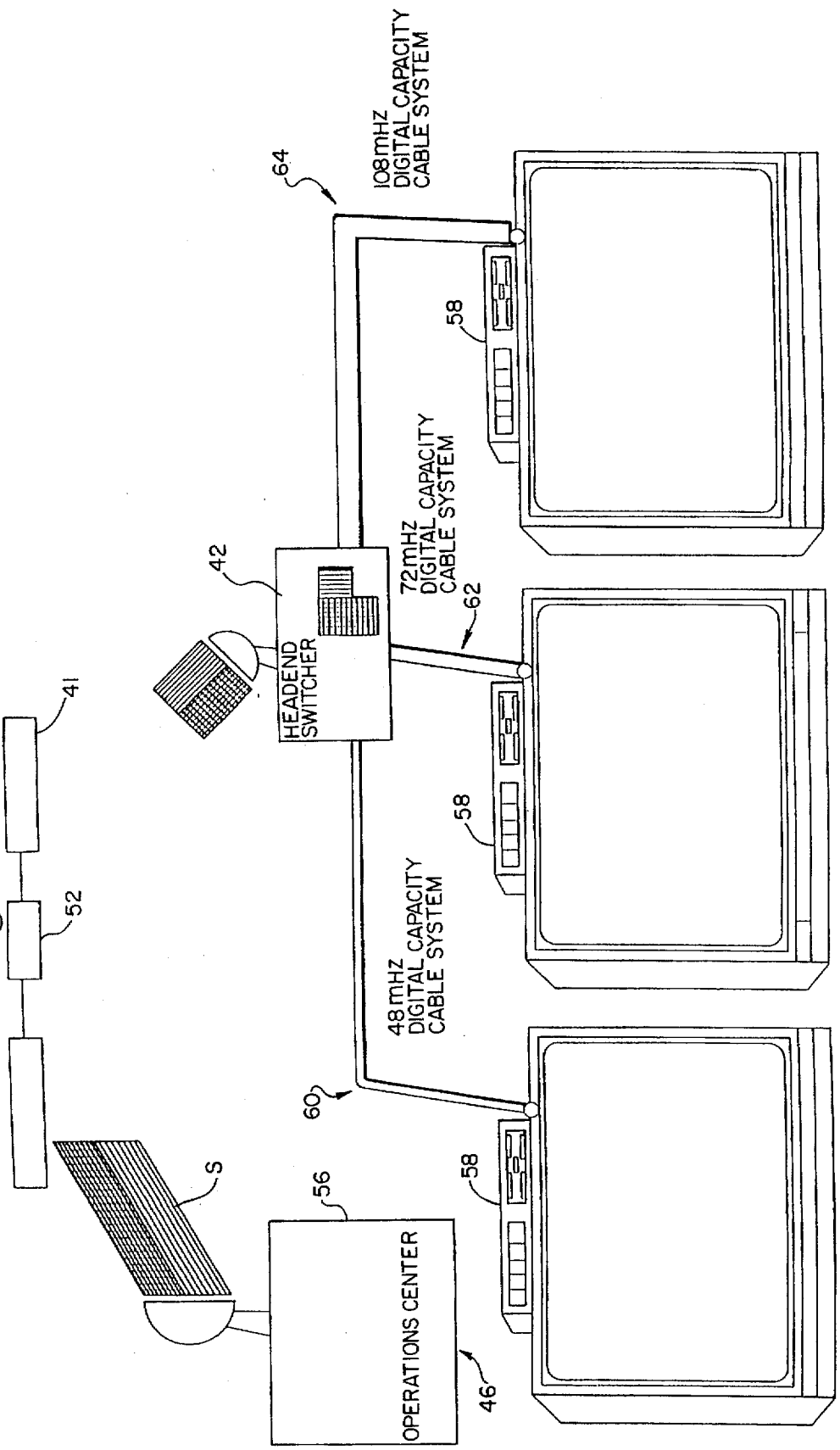
FIG. 3a is a schematic of one cable headend servicing three different concatenated cable systems each with a different available bandwidth.

FIG. 3a depicts a cable headend 42 receiving and routing television programming. More specifically, it shows a cable headend receiving a greater amount of television programming than needed and routing the proper television programs to the proper portion of the cable systems. The digital cable headend of the present invention can perform bandwidth allocation in several ways.

In order to accommodate cable TV systems that have different bandwidths and channel capacities, the cable headend transmits signals of different bandwidths to portions of the concatenated cable system. To accomplish this breakdown, the television programming may be divided into parts such as priority one, two, and three programming. The large bandwidth cable TV systems can accommodate all the parts of the television programming (priority one, two, and three). Those cable TV systems with a more limited bandwidth between cable headend and viewer home are able to use the program delivery system by only accepting the number of parts that the cable system can handle within its bandwidth.

For instance, as is shown in FIG. 3a, three cable television systems 60, 62, 64 with different bandwidths may use the program delivery system 40 and cable headend 42 simultaneously with each concatenated cable system 60, 62, 64 accepting only those parts of the information sent which it is capable of handling. Priority one television programming is accepted by all three systems. Priority two television programming is not accepted by the cable television system whose digital capacity is the smallest, or in this case, the 48 mHz (40 channel analog system with eight 6 MHz segments reserved for digital transmissions) system 60. Priority two television programming is accepted and used by the two larger capacity cable television systems shown 62, 64 respectively. Priority three television programming is only used by the largest capacity television system 64 which is capable of handling all three parts—Priority one, two and three programming (and program menu information if desired).

With this division of television programming, the program delivery system 40 and cable headend 42 may be utilized simultaneously by a variety of concatenated cable systems with varying system capacities. By placing the heavily watched or more profitable programming in the priority one division, both users and owners of the cable TV systems will be accommodated as best as possible within the limited bandwidth.

Using this preferred embodiment, the uplink is able to send one signal "s" to the satellite 41 that is sent to the cable headend 42. Each cable headend 42 accepts the entire signal and customizes the signal for the local cable system by stripping those portions of the satellite signal "s" that are unable to be handled by the local cable system 60, 62, 64. This eliminates the need for requiring the uplinks 46 to send different signals for reception by different capacity cable headends 42.

There are several ways in which the cable headend 42 may strip the unnecessary signals. A person skilled in the art will derive many methods from explanation above and the three examples discussed below.

The first method is for the signal to be sent in portions with each portion having a separate header. The cable headend 42 would then recognize the headers and transmit to the concatenated cable system only those signals in which the proper headers are identified. For example, using three concatenated cable systems 60, 62, 64 shown in FIG. 3a, the headers may be "001," "002," and "003." Wide bandwidth concatenated cable systems 64 can accept program signals with all three headers, while the narrowest bandwidth concatenated cable system 60 may only be able to accept signals with a "001" header.

For this first method, a central Operations Center 56 must divide the program signal into three parts and send a separate leading header before each signal for each part. This method requires the additional signal overhead of a header on the program signal. The header would be transmitted from time to time as necessary.

A second method requires a set of transponders 52 to be assigned to each priority level and the cable headend 42 to route signals from the transponders 52 corresponding to the proper priority level for the concatenated cable system 60, 62, 64. For example, if there are three priority levels and 18 transponders 52, transponders 52 one through nine may be assigned to priority level one, transponders 52 ten through fourteen priority level two, and transponders 52 fifteen through eighteen assigned to priority level three. Thus, a concatenated cable system (e.g., medium bandwidth system 62) capable of operating only at priority level two, would only receive signals from transponders 52 one through nine, and ten through fourteen from the cable headend 42. The program signal from transponders fifteen through eighteen would not be transmitted to the priority level two concatenated cable system.

The third and preferred method is for the cable headend 42 to pick and choose programming from each transponder 52 and create a customized priority one, two, and three signal with chosen television programming. The cable headend 42 would then route the appropriate customized signal to each part of the concatenated cable system 60, 62, 64 that the cable headend 42 serves. This third method requires that the cable headend 42 have a component, such as a Combiner as described below, which can select among programs prior to combining the signal for further transmission on a concatenated cable system. In this manner, a single digital program may be selected from a transponder 52 carrying multiple digital programs.

Figure 3B:
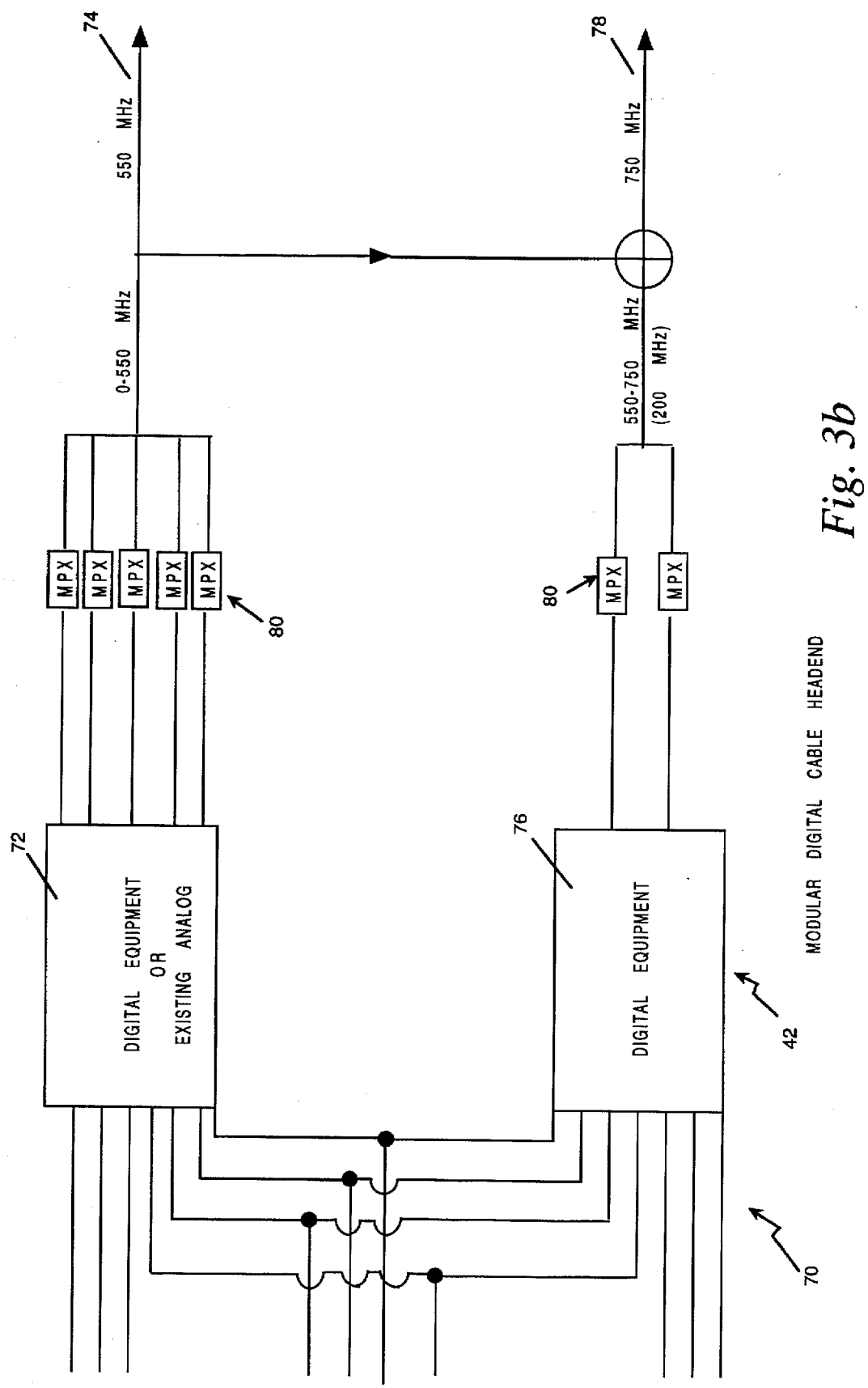
FIG. 3b is a schematic of a modular digital cable headend system servicing two concatenated cable systems.

FIG. 3b shows an example of a cable headend 42 servicing two concatenated cable systems. In particular, FIG. 3b shows a modular solution to the problem of sending different signals down different concatenated cable systems.

In this example, RF signals 70 are received via satellite or land line and sent to two different groups of equipment. FIG. 3b shows a 550 MHz signal (a signal with a bandwidth of 550 MHz, falling within the spectrum of 0 to 550 MHz) being produced by digital equipment or existing analog equipment 72 in a cable headend. This 550 MHz signal is transmitted over a concatenated cable system 74. (In the preferred embodiment, the spectrum of 0 to 50 MHz is reserved for upstream signal activity from the set top terminal.) A second group of equipment 76, which is digital equipment, is shown producing a 200 MHz signal in the 550 to 750 MHz range. The 550 MHz signal (0 to 550 MHz) is shown being combined with the 200 MHz signal (550 to 750 MHz) to produce a 750 MHz signal (0 to 750 MHz) for transmission on a second concatenated cable system 78. Multiplexers 80 are used as necessary.

The system of FIG. 3b can support set top converter boxes 58 with 550 MHz capability as well as converter boxes 58 with 750 MHz capability. The 750 MHz set top terminals 58 of this particular embodiment will handle digital video signals in the 550 to 750 MHz range.

Using this modular equipment concept almost any combination of signals with different bandwidths may be produced for transmission to the viewer homes. Also, using this system, analog and digital signals may be sent on the same concatenated cable system. Combined analog and digital signals involving 48 MHz, 72 MHz and 108 MHz or other bandwidth of digital capacity on a mixed analog digital system are possible using the example shown in FIG. 3b. Also, combinations such as one smaller bandwidth digital signal (e.g., 0 to 550 MHz) and one larger bandwidth digital signal (e.g., 0 to 750 MHZ) are possible.

Preferably, the equipment for both the 550 MHz equipment group 72 and the 200 MHz digital equipment group 76 are able to select individual programs (or channels) from among the many programs (or channels) received on the multiple RF signals 70. Alternatively, certain RF signals 70 may be sent to the 550 MHz equipment group 72 and other RF signals 70 may only be sent to the 200 MHz equipment group 76. This can be accomplished by assigning each group of equipment to receive signals from specific satellite transponders 52 (e.g., transponders 1 through 9 assigned to equipment group one, transponders 10 through 14 assigned to equipment group two). Various priority levels can be distributed to viewer homes using a modular headend design. If transponders 52 are designated or assigned to certain priority levels, then each equipment group may be assigned priority levels and receive signals from specific transponders.

DIGITAL VERSION

Figure 4:
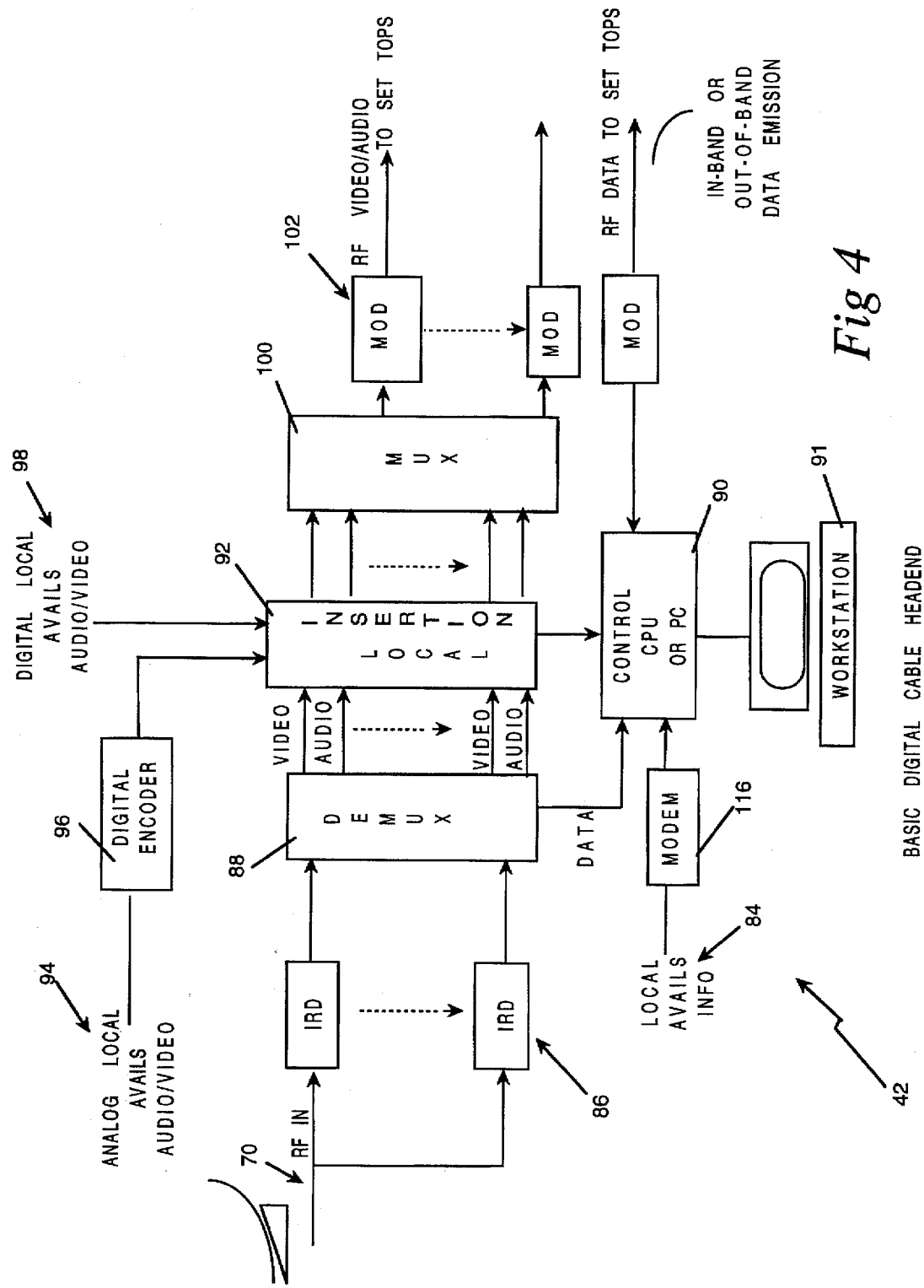
FIG. 4 is a schematic of the primary components of a basic digital cable headend for a digital cable television delivery system.

FIG. 4 shows the basic components of a digital headend 42 which has the capacity to insert local programs (also known as local avails 84). The headend 42 shown receives an RF signal 70 from each transponder 52 and processes each signal through an Integrated Receiver Decoder (IRD 86) (or Integrated Receiver Transceiver (IRT)). Each transponder signal carries multiple programs (video/audio signals). To allow for later insertion of local programs, a demultiplexer 88 is used to demultiplex the signal into separate video/audio signals. In addition, any data carried by the transponder signals is demultiplexed and communicated to a Control CPU 90.

Information on local avails 84 (or local programming) is provided to the Control CPU 90 either manually by an operator or through a remote signal from a national site (not shown). For manual entry of local programming information, a workstation 91 or terminal is provided. Although a simple terminal with a CRT can accomplish the data entry, a workstation 91 with a graphical display and a mouse is preferred. From this workstation 91, numerous commands and a variety of data is provided to the Control CPU 90. A modem 116 is provided for receiving local avail information 84 from a remote location. A variety of communication methods may be used to receive the local avail information from the remote site. Using the demultiplexed data signal and information on local avails, the Control CPU 90 inserts any necessary local programming using the local insertion device 92.

It is preferred that the local insertion device 92 receive local programs (video/audio in digital format) for insertion directly from a separate feed 94. The separate feed 94 may be an analog feed with a digital encoder 96 or a direct digital feed 98. The local programming may be commercials or full length programs. The local insertion device adds local programs onto the digital video signals based on instructions from the Control CPU 90. Following passage through the local insertion device 92, the signal is processed through a multiplexer 100 and modulator 102 before transmission to set top terminals 58 at the viewer homes.

Using the data signal from the transponders 52 and the local avail information 84, the Control CPU 90 shown generates a digital data signal called the set top terminal control information stream (STTCIS). The set top terminal control information stream is modulated and also sent to the set top terminals 58. A variety of information to assist the set top terminal 58 may be sent on this control Information stream (as discussed with FIGS. 11 and 12 below). For systems with set top terminals that are unable to use the STTCIS, this data signal is unnecessary.

DIGITAL VERSION—WITH COMBINER

Figure 5A:
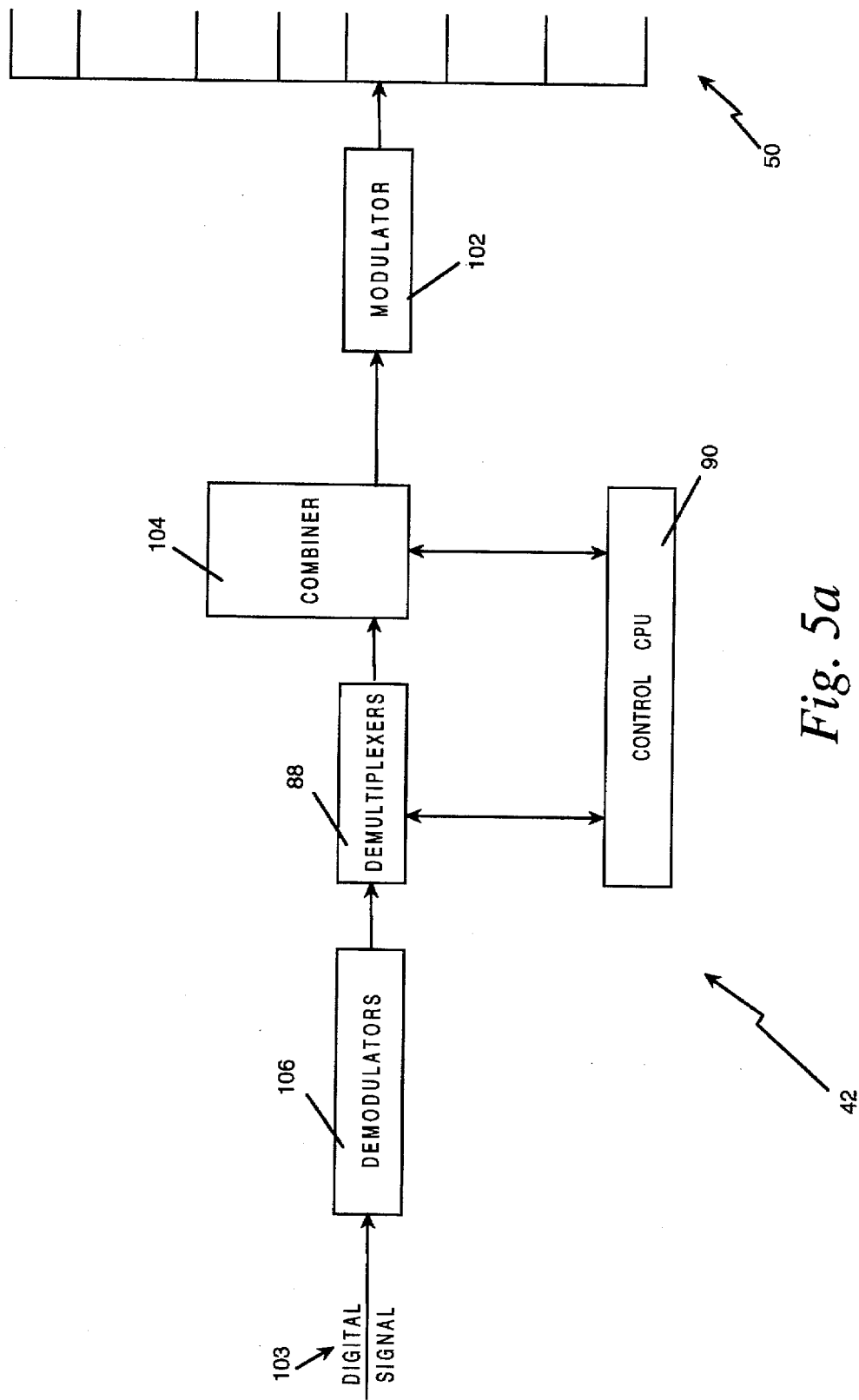
FIG. 5a is a schematic of the primary components of a digital cable headend with Combiner for a digital cable television delivery system.

FIG. 5a shows the basic components of a cable headend 42 with a Combiner 104 that only handles digital television programming signals 103. The operation of the cable headend 42 is controlled by the Control CPU 90 which may receive data signals from a remote source (not shown).

After an incoming signal is demodulated by demodulators 106 and demultiplexed by demultiplexer 88 into separate television programs, the signal is processed through a packet switcher and combined with other television program signals. This combining is performed by the Combiner 104 with the aid of the Control CPU 90.

After being combined, the signal is modulated by the modulator 102 and transmitted to one or more concatenated cable systems 50 to the viewer homes. If different bandwidths of television programming are required for different portions of the cable system, more extensive hardware and software is required for the Combiner 104. Multiple Combiners 104 can be used in parallel or in series to accommodate concatenated cable systems 50 with different bandwidths as described later. Also, multiple Combiners 104 can be used in a modular system design as shown in FIG. 3b.

A portion of the digital signal received by the headend 42 may be a digital data signal 103 from a remote location. This digital data signal 103 is processed through the demodulators 106 and demultiplexers 88 before being communicated to the Control CPU 90. The Control CPU 90 will use the signal as necessary to assist in the combining process.

DIGITAL AND ANALOG VERSION—WITH COMBINER

Figure 5B:
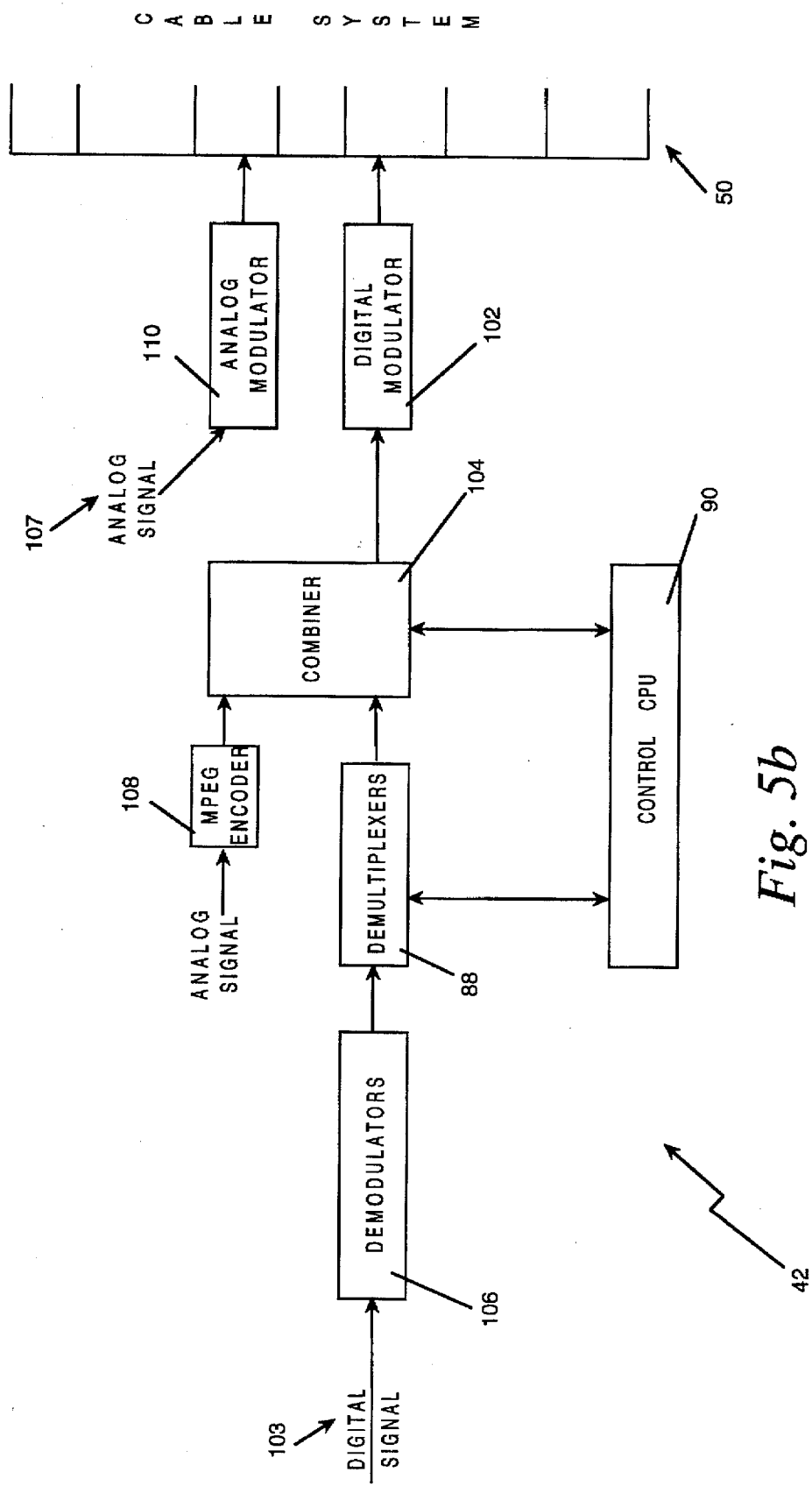
FIG. 5b is a schematic of the primary components of a digital/analog cable headend for a combined digital and analog cable television delivery system.

FIG. 5b shows a similar system to FIG. 5a except that analog signals 107 as well as digital signals 103 can be manipulated by the headend 42. Analog television program signals 107 are either digitized by an encoder 108 and passed through the Combiner 104 or processed through an analog modulator 110. Although a variety of digital coders may be used, an MPEG encoder 108 is preferred. The MPEG encoder 108 performs the functions of digitizing and compressing in the same step. Those analog signals 107 which are digitized are accepted by the Combiner 104 and combined as necessary with digital program signals to be transmitted to the viewer.

The analog signals 107 which are modulated are simply placed directly on the concatenated cable system 50 at an appropriate unused location in the bandwidth (currently 6 MHz of available bandwidth is required). Using this method of including analog programs at the headend 42 produces a mixed analog and digital signal for use by the set top terminal 58. Appropriate set top terminal equipment is necessary to handle the mixed analog and digital program signal. The set top terminal 58 tunes to the correct 6 MHz within the signal spectrum for reception of programs transmitted in analog format.

Although two methods of including analog signals 107 are shown in the same headend 42, either method may be sufficient by itself. Digitizing analog program signals 107 using a digital encoder 108 is preferred since this method allows a completely digital output to be transmitted to viewer homes. Use of a digital encoder 108 also simplifies local insertion of programs by the Control CPU 90.

DETAILS ON SYSTEM OPERATION

Figure 6A:
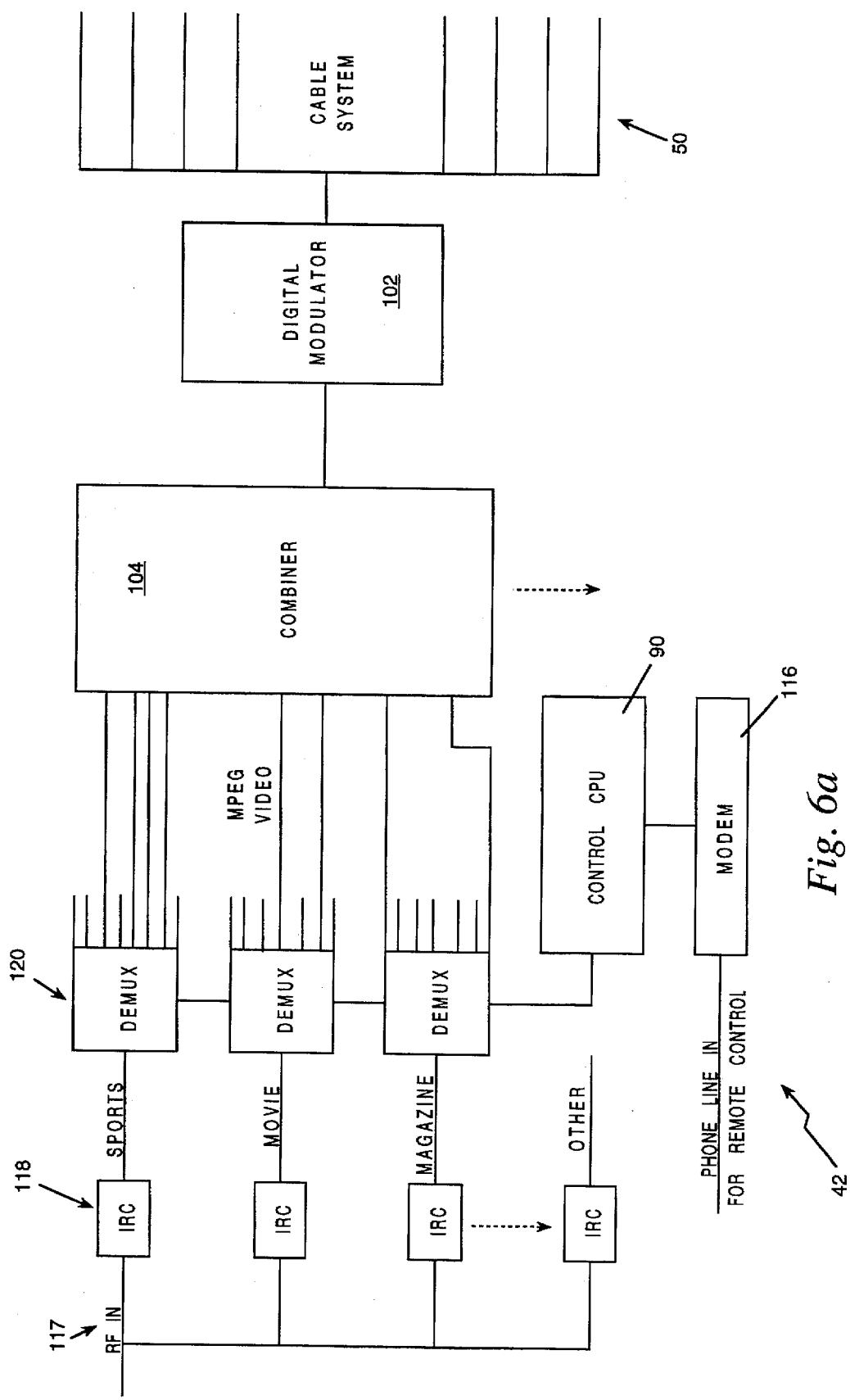
FIG. 6a is a schematic of the primary components of an alternative embodiment for a digital cable headend with Combiner and remote control access.

FIG. 6a shows a more detailed embodiment of an advanced system headend 42 that handles only digital signals 117. This embodiment shows that the transponder 52 information can be packaged or organized by subject matter before transmission to the headend 42. For example, one transponder 52 carries sports programming, another carries Movies, a third carries Magazines, etc. This organization of programming is not necessary for the operation of the system 42.

This embodiment also provides for remote control of the Control CPU 90 by modem 116. The embodiment of FIG. 6a uses MPEG 2 as the digital encoding technique. Many compression techniques such as MPEG are available and can be used with the present invention.

The Integrated Receiver Components (IRCs) 118 shown demodulates and unscrambles (if necessary) the received transponder signals which may contain 4, 6, 8, or more audio/video channels of information. The IRC 118 demodulates the transponder signal into a digital bit stream of multiplexed digitized MPEG 2 format video. In an alternative embodiment, descrambling is performed by a separate descrambler. In another alternative embodiment, the multiplexed MPEG signal is encrypted before transmission to the headend 42 and decrypted by the IRC 118.

The demultiplexers 120 separate the multiplexed signals into separate individual MPEG format digital channels. Although FIG. 6a shows that the IRC 118 are each hardwired to specific demultiplexers 120, it is preferred that demultiplexers 120 be capable of cross connecting to any IRC 118. Specifically, the preferred Control CPU 90 assigns the demultiplexers 120 to receive a multiplexed MPEG signal 117 from a chosen IRC 118. Depending on the transponder signal received, the demultiplexer may have 4, 6, 8 or more cross connects to the Combiner 104. The outputs of the demultiplexers 120 are selectively enabled by the Control CPU 90. Those outputs of the multiplexer that are enabled are then input to the Combiner 104.

The Control CPU 90 of FIG. 6a may be instructed by a remote site (e.g., a national site) via a modem 116 or similar connection. Therefore, the remote site is able to control the output of the demultiplexers 120. Alternatively, instead of enabling the outputs of the demultiplexers 120, the inputs of the Combiner 104 may be selected by the Control CPU 90. By enabling or selecting multiplexer outputs, the Control CPU 90 is able to control which television programs are combined and transmitted to the viewers.

The Combiner 104 combines the enabled or selected outputs of the demultiplexers 120 into the proper format. The Combiner 104 then outputs the signals to a modulator 102. Although a digital Quadrature Amplitude Modulator (QAM) or like device is preferred, various different types of modulation techniques may be used with the invention.

The QAM outputs a modulated RF carrier combined with other carriers onto the cable system 50. The converter boxes 58 in the homes select and demodulate a particular channel selected by the user. Although cables are the most common transmission media to homes, any media including fiber, microwave transmission or telephone lines may be used for carrying the signal.

Figure 6B:
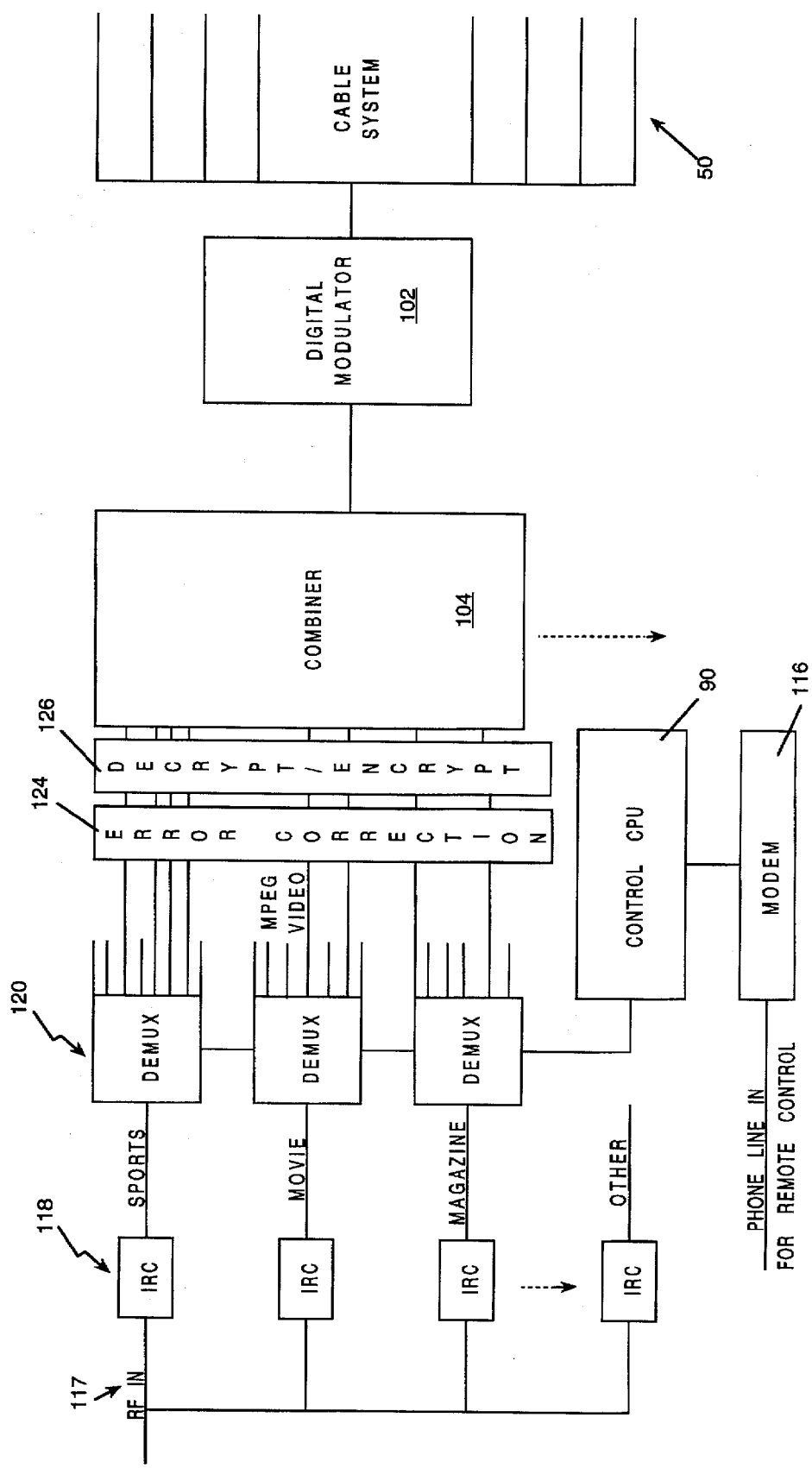
FIGS. 6b and 6c are schematics of the components of alternative embodiments for a digital cable headend.

FIG. 6b shows a nearly identical embodiment as FIG. 6a with the addition of error correction equipment 124 and decryption/encryption equipment 126. Almost any digital error correction equipment 124 and technique may be used to ensure the integrity of the digital video/audio data. Although the error correction could take place in a variety of locations (e.g. before demultiplexing or within the combiner process), it is preferred that the error correction be conducted prior to combining.

FIG. 6b shows an embodiment which can perform decryption and/or encryption (if necessary) with decryption and encryption equipment 126 located between the demultiplexers 120 and the Combiner 104. There is no cable industry standard that has been established for digital encryption. Generally, each set top terminal vendor uses a separate encryption/decryption methodology. In the large digital delivery systems of the future, the digital video programs will likely be encrypted to suit particular set top terminal vendor decryption equipment before the programs are transponded. Thus, incompatibility problems may arise between encrypted signals received by transponder 52 and a digital headend's 42 set top equipment 58 being serviced. This problem may be solved through the use of decryption and encryption equipment 126 at the headend 42.

Once the signal 117 has been demultiplexed 120 into separate video "channels," it may be decrypted and encrypted 126. The unwanted encryption format may be removed by decryption. A new encryption methodology, consistent with the decryption of the set top equipment 58 serviced by the headend 42, may be added by encrypting the signal (at the headend 42) before transmission to the set top terminals 58. Although a variety of digital encryption methodologies may be used with the invention, the Digital Encryption Standard (DES) widely used in the defense industry is a preferred method.

Although the decryption/encryption equipment 126 is shown located after the demultiplexers 120 and between the error correction 124 and the Combiner 104, it may be located elsewhere. For example, the equipment may be located within some of the Combiner 104 components (described later) or it may also be located in a different location with reference to the error correction 124.

Figure 6C:
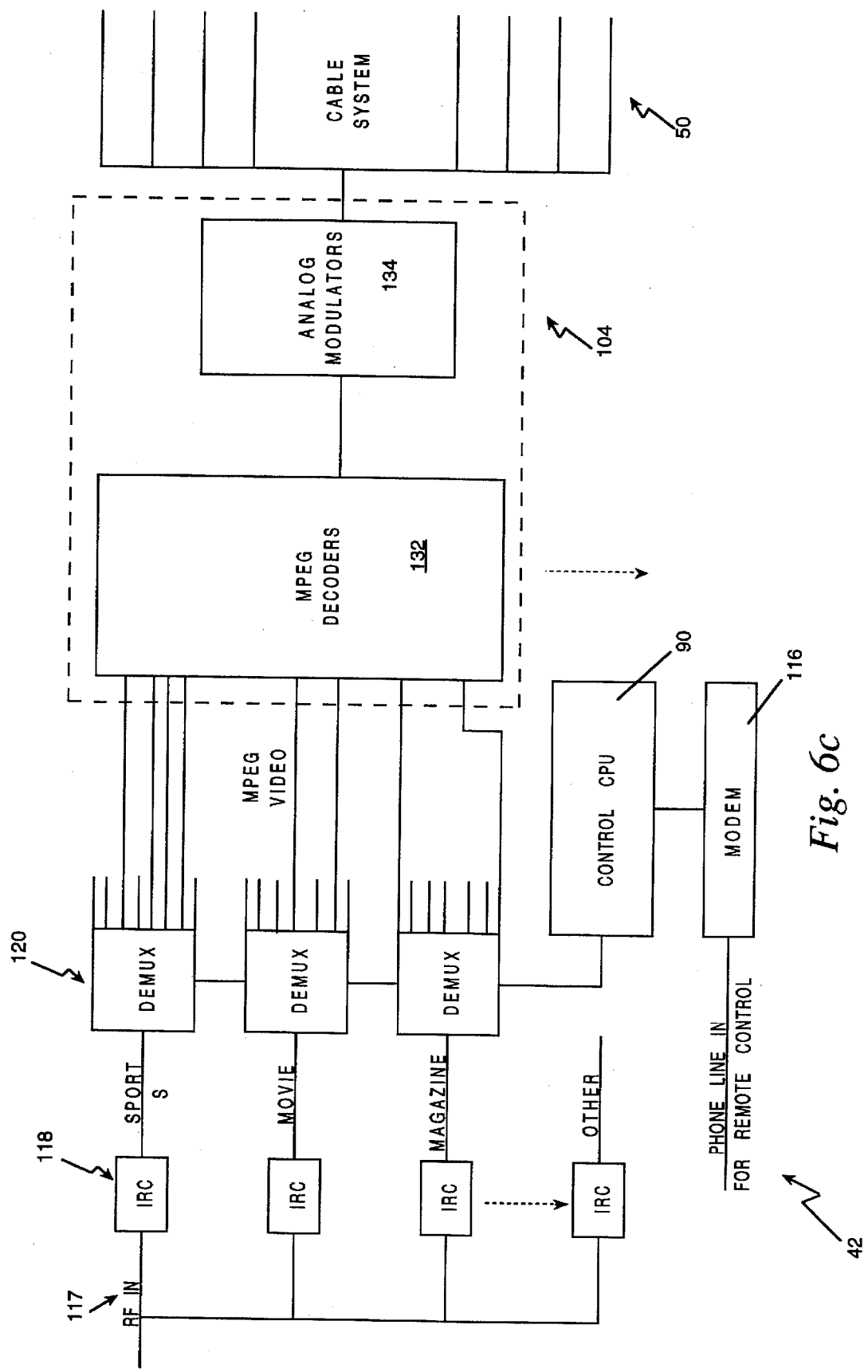

FIG. 6c shows a digital-in-analog-out headend 42' which utilizes a Combiner 104 comprising MPEG Decoders 132 and analog modulators 134. The video is received in digital format, manipulated, converted and transmitted to the set top terminals 58. In this particular design, the video is converted from digital format to analog format for transmission to the set top terminals 58 (in analog format). Using this embodiment, the advantages of compressed video transmissions over satellites can be realized without changing a large installed base of analog set top terminals 58.

RF signals 70 are received by the headend 42 from satellite, landline or other means of communications. The Control CPU 90 shown may be remotely controlled or given specific instructions locally. The Control CPU 90 instructs the demultiplexers 120 on the identification of a subset of the digital video signals. This subset of video signals are selected for further processing by the headend 42'.

Following selection of the digital video, the digital video signals are processed through decoders 132. FIG. 6c shows each signal processed through an MPEG decoder 132. Those skilled in the art will realize that a variety of coding and decoding methods may be used. Following decoding, each analog video signal is processed through an analog modulator 134 before transmission to the set top terminal 58 (not shown). Multiple IRCs 118, demultiplexers 120, MPEG decoders 132 and analog modulators 134 may be used in this configuration. The size of the headend 42' is limited by the available bandwidth to the subscriber home.

The following is an example of one program, a sports program, being processed. A desired sports program may be received at the cable headend 42 from a transponder 52 designated for sports. The demultiplexer 120 assigned to the sports transponder is instructed to select the desired sports program. The sports program is then decoded into analog format and processed through an analog modulator 134. The analog modulator 134 may then place the program into 6 MHz of available bandwidth (e.g. between 544 MHz to 550 MHz) on the concatenated cable system 50.

The Combiner 104 can be used in conjunction with a variety of headend 42 components. Those skilled in the art will recognize that a variety of component substitutions can be made to the headend 42 within the spirit and scope of the invention.

COMBINER SYSTEM HARDWARE

Figure 7:
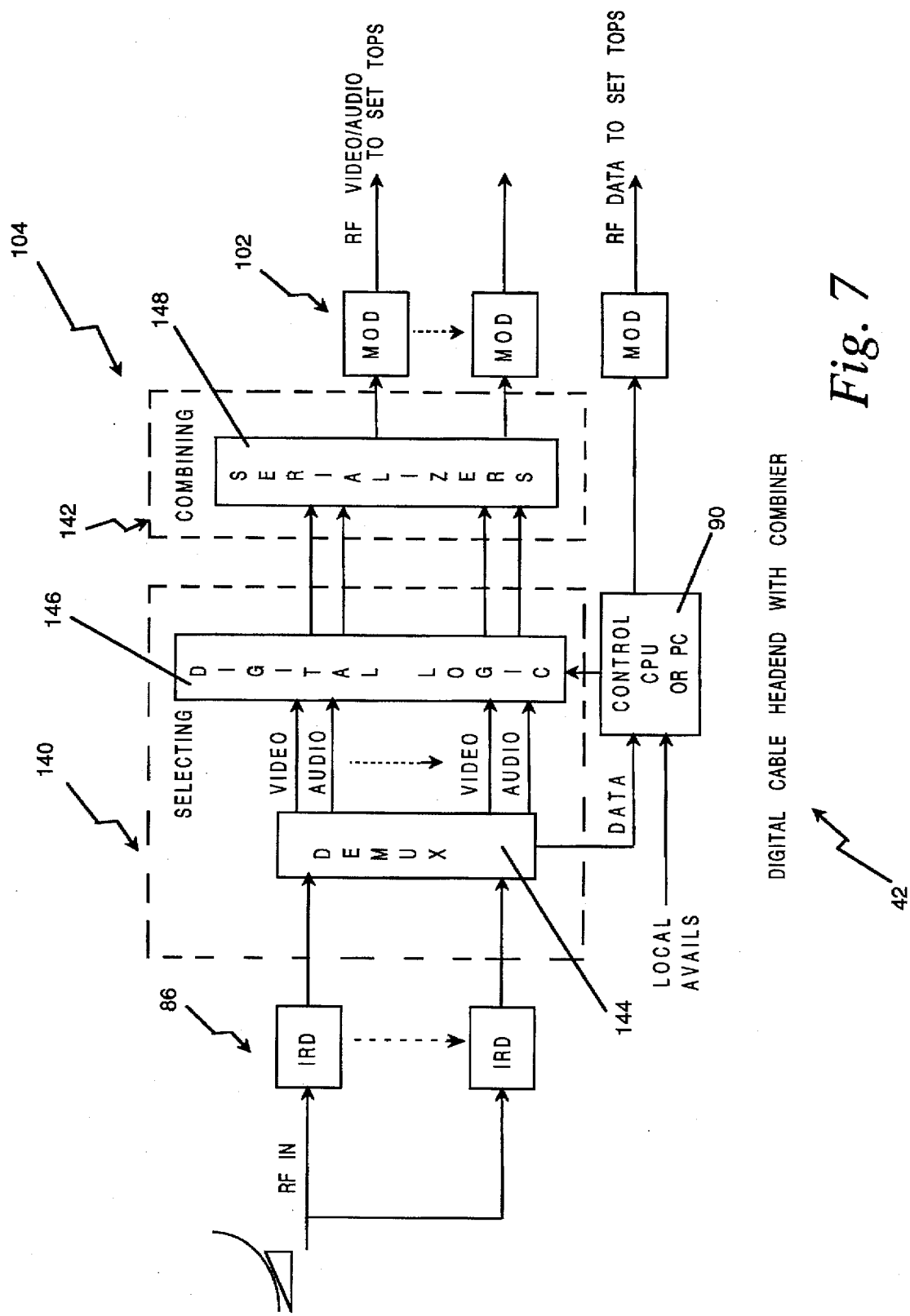
FIG. 7 is a detailed schematic of a digital cable headend with Combiner.

FIG. 7 shows a more detailed view of one embodiment of a cable headend 42 with Combiner 104. Specifically, FIG. 7 depicts the Combiner's 104 major components 140, which include components that provide a selecting function and other components 142 that perform signal combining. The selecting function components include the demultiplexer 144 and digital logic components 146, which receive instructions from the Control CPU 90. The serializer 148 performs the final step of the Combiner 104, combining the signal.

In this embodiment, data is received by a Control CPU 90 along with any local avails 84. The Control CPU 90 generates a data signal, the set top terminal control information stream. The data signal is processed by the data modulator 102 and transmitted to the set top terminal 58. The Control CPU 90 also sends control signals to the digital logic 146.

The control signals instruct the digital logic 146 on the video to be combined. The digital logic 146 selects the videos to be combined and sends the video signals to the serializer 148 in an appropriate timing sequence. The serializer 148 subsequently creates one signal for transmission to the set top terminal 58.

In addition to providing instructions to the Combiner 104 for selection of videos, the Control CPU 90 effectuates the combining process and monitors the process to ensure the integrity of the combined signal. The hardware configuration of FIG. 7 can be adapted for any number of transponders 52 and video/audio signals. The number of modulators 102 needed varies depending on the specific embodiment.

Figure 8:
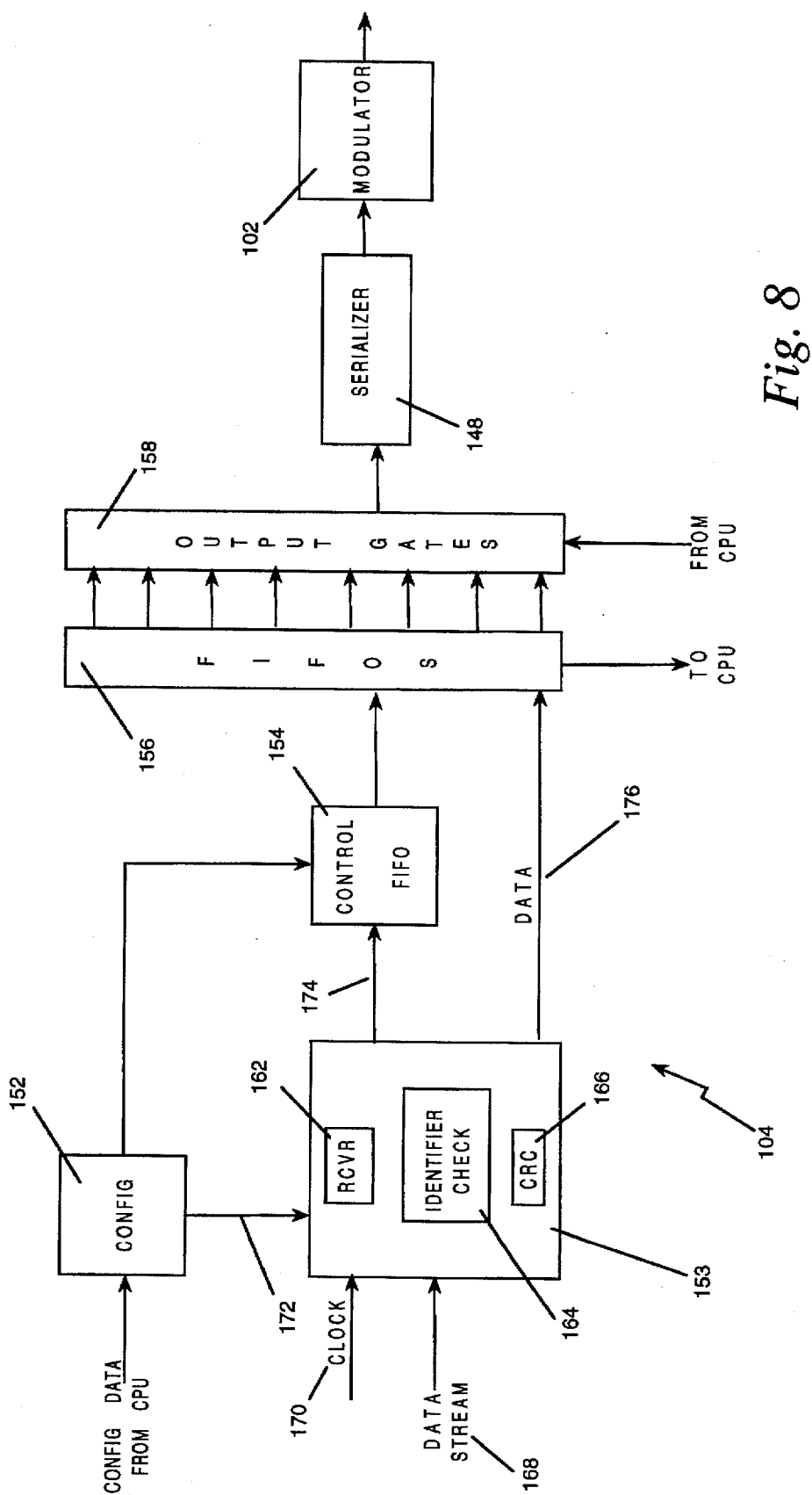
FIG. 8 is a schematic of the components of the Combiner.

FIG. 8 is a detailed schematic of a preferred design for a Combiner 104. The Combiner 104 hardware consists of the following logic: configuration block 152, logic block 153, control FIFO 154, FIFOs 156, Output Gates 158 and a serializer 148. The Combiner 104 is followed by a modulator 102 for modulating the signal before transmission to the set top terminals 58. The schematic of FIG. 8 can be adapted for any number of video signals.

The configuration block 152 receives instructions from the Control CPU 90. The configuration block 152 instructs the control FIFOs 154 and the logic block 153 on the video signals to be passed. The configuration block 152 configures the Combiner 104 by providing the necessary information to assign FIFOs 156 to handle specific program signals included within the digital video data stream 168.

The logic block 153 consists of the following sublogic elements: a receiver 162, identifier check 164, and a Cyclic Redundancy Check (CRC 166). The logic block 153 receives a digital video data stream 168, a clock signal 170, and a configuration signal 172 (from the configuration block). The logic block 153 outputs control signals 174 to the Control FIFO 154 and data signals 176 to a bank of FIFOs 156. The receiver 162 and identifier check 164 use the configuration signal 172 to determine the identity of video data to be passed through to the FIFOs 156. In this manner, the logic block 153 divides the video data stream 168 into its component parts. The identifier check 164 examines the addresses (or other identifying data) attached to the video data to separate the video data into parts, each part being a different program. A CRC 166 or other check may be included with the logic block.

Each FIFO 156 acts as a buffer, temporary storage, and passes packets of video to the output gates 158. Preferably, there is one logic gate associated with each FIFO 156. FIFOs 156 and logic gates commonly used in the electronics industry can provide the capabilities described. In the preferred embodiment, the FIFOs 156 include level indicators or "trigger points" to assist the Control CPU 90 in closely monitoring the data flow. To limit the breaking up of segments of data, it is preferred that the FIFOs 156 be at least large enough to hold an integer number of frames or packets of data.

If delaying of programming and minor changes in program scheduling is acceptable, then FIFOs 156 may provide large temporary storage. This storage capacity will allow minor time shifts in programming to ensure that no overflow conditions occur. The FIFOs 156 must be large enough to handle the worst case, or highest burst of speed on all channels without overflowing. Any loss of data from a FIFO 156 would result in picture disruption. The disruption may be very annoying to viewers.

In the preferred embodiment, where cost and maintaining an exact program schedule is important, the FIFOs 156 are not large enough to handle all overflows. Regardless of the size of the FIFOs 156, timing considerations are still important. The size of the FIFOs 156 is dictated by a series of factors such as cost, acceptable loss of data, scheduling and timing concerns. These factors must be balanced to determine the size of the FIFOs 156 needed for any particular embodiment.

Data re-synchronization is a complex part of the Combiner's 104 task. The logic block 153 monitors all the FIFO 156 activity and according to a fixed algorithm, will control the output gates 158. The logic block 153 and control FIFO 154 effectively open and close the gates 158 in a fashion that maintains constant output to the modulator 102 while not allowing any FIFO 156 to overflow data. There may be times when the data flow Is too slow and dummy data may need to be placed in the data stream 168 before the final output to the serializer 148. This is necessary to maintain a full bit stream speed to the set top terminals 58.

The output gates 158 pass the video to the serializer 148. The serializer 148 converts the data stream 168 from the FIFOs 156 (preferably 8-bit wide) into a single bit output stream. The stream is placed on the cable system or other transmission media.

Figure 9A:
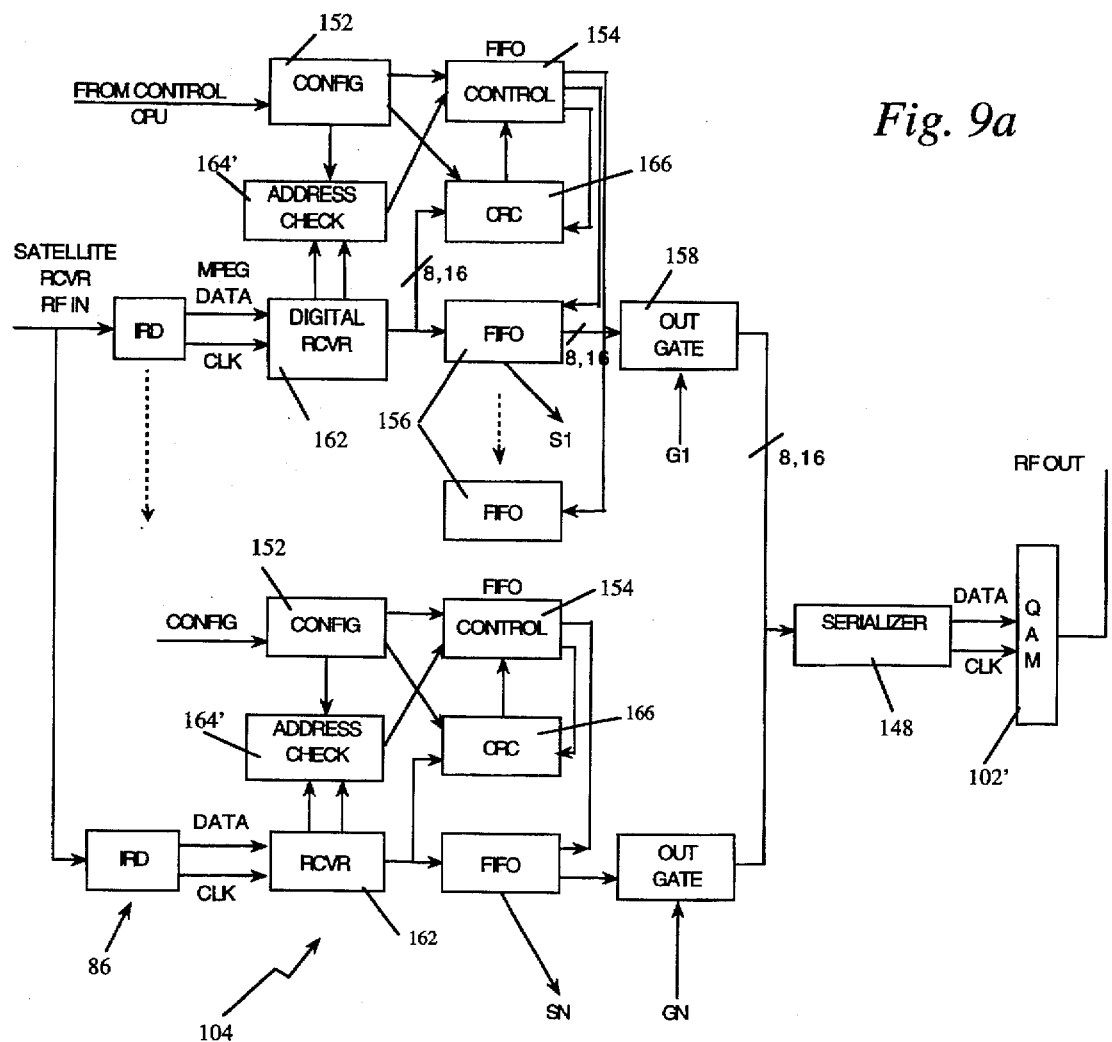
FIG. 9a is a more detailed schematic of the components of the preferred embodiment of the Combiner.
Figure 9B:
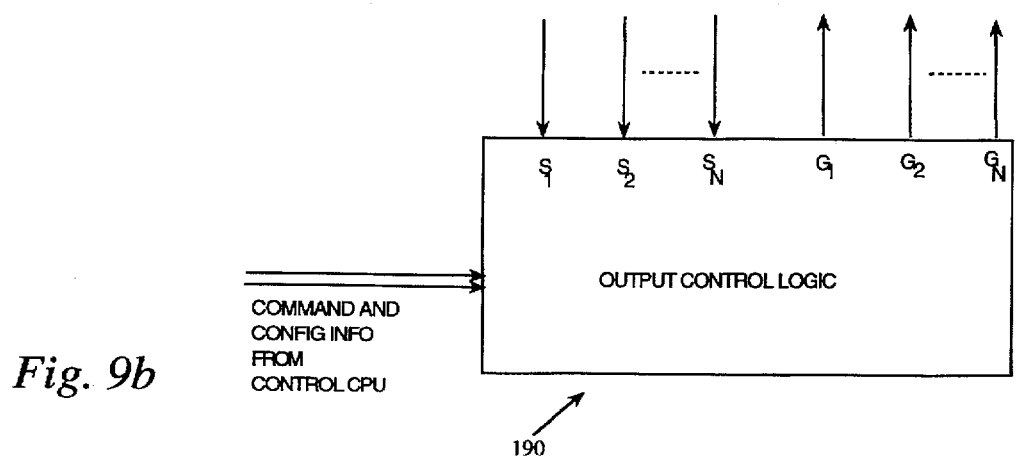
FIG. 9b is a schematic of the output control logic for the Combiner.

FIGS. 9a and 9b show a more detailed schematic of one hardware implementation of the Combiner 104. FIG. 9a shows the specific hardware of the Combiner 104 in an embodiment which uses IRDs 86 and a QAM 102. FIG. 9b shows the output control logic 190 which may be located remotely from the Combiner 104. In the preferred embodiment, the output control logic 190 is located between the Control CPU 90 and Combiner 104.

Referring to FIG. 9a, an RF signal 70 is received from a satellite 41 and passed to an IRD 86. The IRD 86 processes the signal into an MPEG data signal 176 and a clock signal 170. Both the MPEG data signal 176 and clock 170 are passed to the digital receiver 162.

The receiver 162 accepts a serial MPEG data stream and clock information 170 from the IRD 86. The receiver 162 converts the data into parallel 8-bit wide information. Each 8 bits of data received is compared using the address check 164' (or other identifier or address check 164') to addresses stored in the address check 164'. If there is an address match, the data of that particular packet is routed to the appropriate FIFO 156 which is handling data for that address. If there is no match, then the data is not routed to any FIFO 156. In other words, unneeded video/audio bit streams are not routed to any FIFO 156 but are simply ignored.

Each FIFO 156 is assigned to handle a particular video signal. These assignments may be made dynamically. The assignments are not required to be in any particular order, any FIFO 156 can be assigned any video. In alternative embodiments with FIFOs 156 of different size, fast video signals are assigned to larger FIFOs 156. Since the video signal's MPEG packets are addressed, each FIFO 156 is assigned to receive certain video packets in MPEG format that have the appropriate address assigned to that FIFO 156.

The FIFO control 154 also increments the FIFO 156 input address counter. In this manner, the control logic 154 is able to monitor the level of video packets input to the FIFO 156 and send the appropriate signal to the Control CPU 90 when the FIFO 156 is reaching its capacity. It also allows the Control CPU 90 to monitor the levels in each FIFO 156.

The FIFO control block 154 increments a FIFO 156 input and output address counter. In this manner, the FIFO control block 154 can keep track of both the input and the output flow to each FIFO 156.

The cyclic redundancy check (CRC 166) calculates the CRC 166 of the data section of the packet on the fly so that when the last byte of data has been latched into the FIFO 156 the calculated CRC 166 can be compared to the CRC 166 appended to the end of the data section of that packet. If there is a difference in one or more bits of the 32-bit CRC 166, then an error flag is set to indicate a flawed packet is coming through. The Control CPU 90 and control logic 154 must decide whether or not to pass flawed packet. It may also be possible to correct the error downstream after the serializer 148 but prior to the modulation.

Each time the output gate 158 is enabled, a number of packets are transferred to the serializer 148. In the preferred embodiment, no subsets of packets are transferred to the serializer 148. The serializer 148 converts 8-bit wide data from the FIFOs 156 into a single bit output stream.

SOFTWARE

Figure 10A:
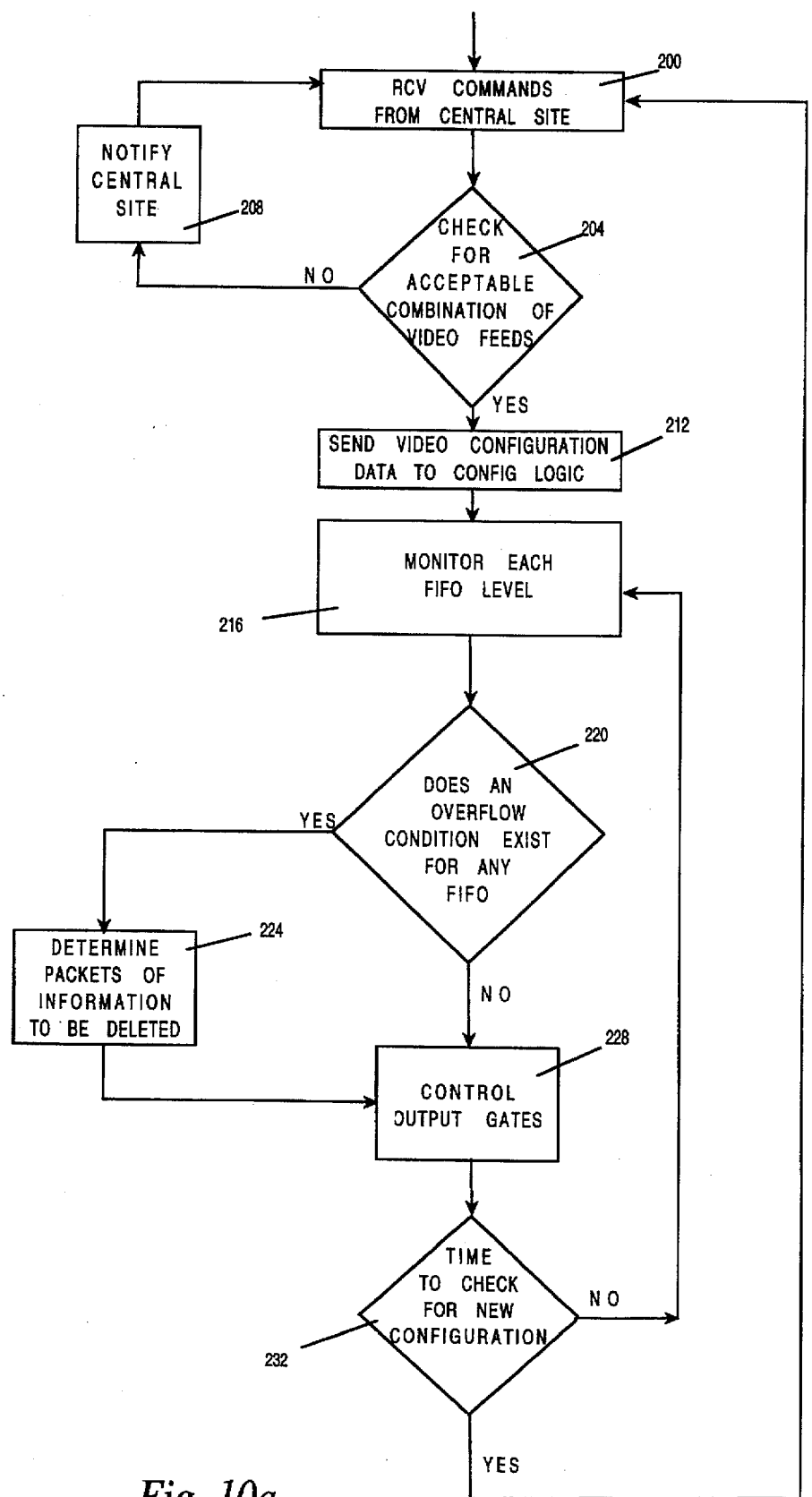
FIG. 10a is a high level software flow chart for control CPU software which controls the Combiner.

FIG. 10a is a high-level flow chart of the software resident at the Control CPU 90 to operate the Combiner 104. The Control CPU 90 sends appropriate instructions to various components of the Combiner 104 to ensure the selection of appropriate videos and that the video signals are combined in an appropriate manner. All of the software shown in FIGS. 10a through 10c and described below may be implemented in hardware instead of software. The software routines may be hardwired as part of the Combiner 104.

The Control CPU 90 will first receive commands from a central site (block 200). These commands will include which video signals should be selected and other information such as the types of signals (fast or slow video signals), whether the video is encrypted and the encryption methodology used, etc. The video can be categorized or "typed" by the bit rate of the data flow such as slow medium and fast data flow. Fast video or fast changing video with a great deal of movement requires a "faster" bit rate than slow moving video or still video.

Some video segments (or channels) may require less dam flow because of less background movement or motion (slow video signals), while other video segments may require greater data flow because of more background motion and changing details (fast video signals). For instance, action scenes in sports or movies require greater video data than still pictures or pictures with mostly blue sky background. In the preferred embodiment, this type of information on the video segments is received by the Control CPU 90 from the central site. Alternatively, the video type information (fast or slow) may be determined using digital equipment at the headend 42. This digital equipment senses the mount of data and determines the type of video being received.

Upon receipt 200 of the information from the central site, the Control CPU 90 will check that the video combination requested by the central site is an acceptable combination of video feeds (block 204). If the central site (block 200) has requested a combination that is beyond the capability of the Combiner 104 equipment located at that cable headend 42, a notification signal (block 208) will be sent to the central site (block 200) requesting new information. The combination of video feeds (decision block 204) may be inappropriate for a variety of reasons, including too many video feeds (which is determined by decision block 204) or too many video packets to combine (or too much fast changing video, fast video). Although only one verification check is shown for the information received from the central site, those skilled in the art will realize that many verification checks on the information from the central site may be conducted. Following verification, notification or reject signals may be sent to the central site.

Following the verification checks, the Control CPU 90 sends video configuration data to the configuration logic (function block 212). This configuration data will inform the Combiner 104 of each video signal to select and each signal to de-select.

The software (block 200), which receives information from the central site, verifies it, and generates configuration data to send to the configuration logic, (function block 212) may be executed at irregular intervals. The remaining portions of the software should be executed on a regular basis.

The Control CPU 90 monitors (block 216) each FIFO 156 to determine what percentage of FIFO 156 capacity is filled. To accomplish this task, the Control CPU 90 will receive electrical signals from either the control FIFO 154 or each individual FIFO 156. These signals will be analyzed and a determination on the level of each FIFO 156 is made. Following this analysis, the Control CPU 90 will determine if any one FIFO 156 exceeds the first threshold level set on percentage of capacity filled (e.g., 75% filled) (decision block 220). If one of the FIFOs 156 exceeds the first threshold level of capacity filled, then an overflow condition exists. If there is an overflow condition, the Control CPU 90 must take steps to determine which packets of information may be deleted, 224. This is further described in FIG. 10c. After an appropriate number of packets of data are deleted to eliminate the overflow condition, the system controls the output gates (block 228). Of course, if there is no overflow condition, the system may proceed directly to controlling the output gates 228. The Control CPU 90 instructs the output gates (block 228) to open at the appropriate times. This is defined in further detail with the description of FIG. 10b below.

Following the control of the output gates (block 228), the CPU 90 determines whether it has received further information from the central site (block 200) or whether it is time for it to reconfigure the selected videos (decision block 232). If the Control CPU 90 has received new signals from the central (site block 200), then it processes those signals and determines whether there are any changes to the video selection. If it has not received any signals from the central site, it still determines whether it has reached a time period, such as on the hour or on the half hour, when changes to the selected video are required. If changes are required or a new configuration is required, the software will cycle to the subroutines which handle the configuration.

Figure 10B:
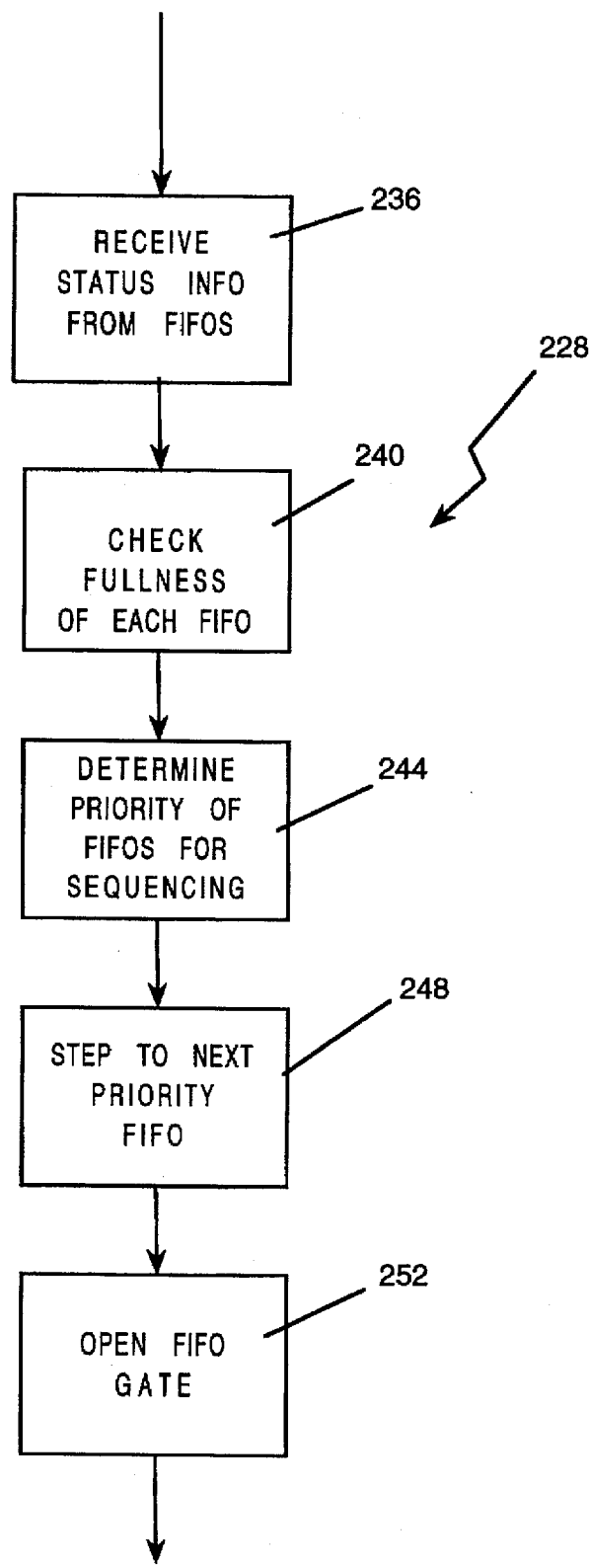
Figure 10C:
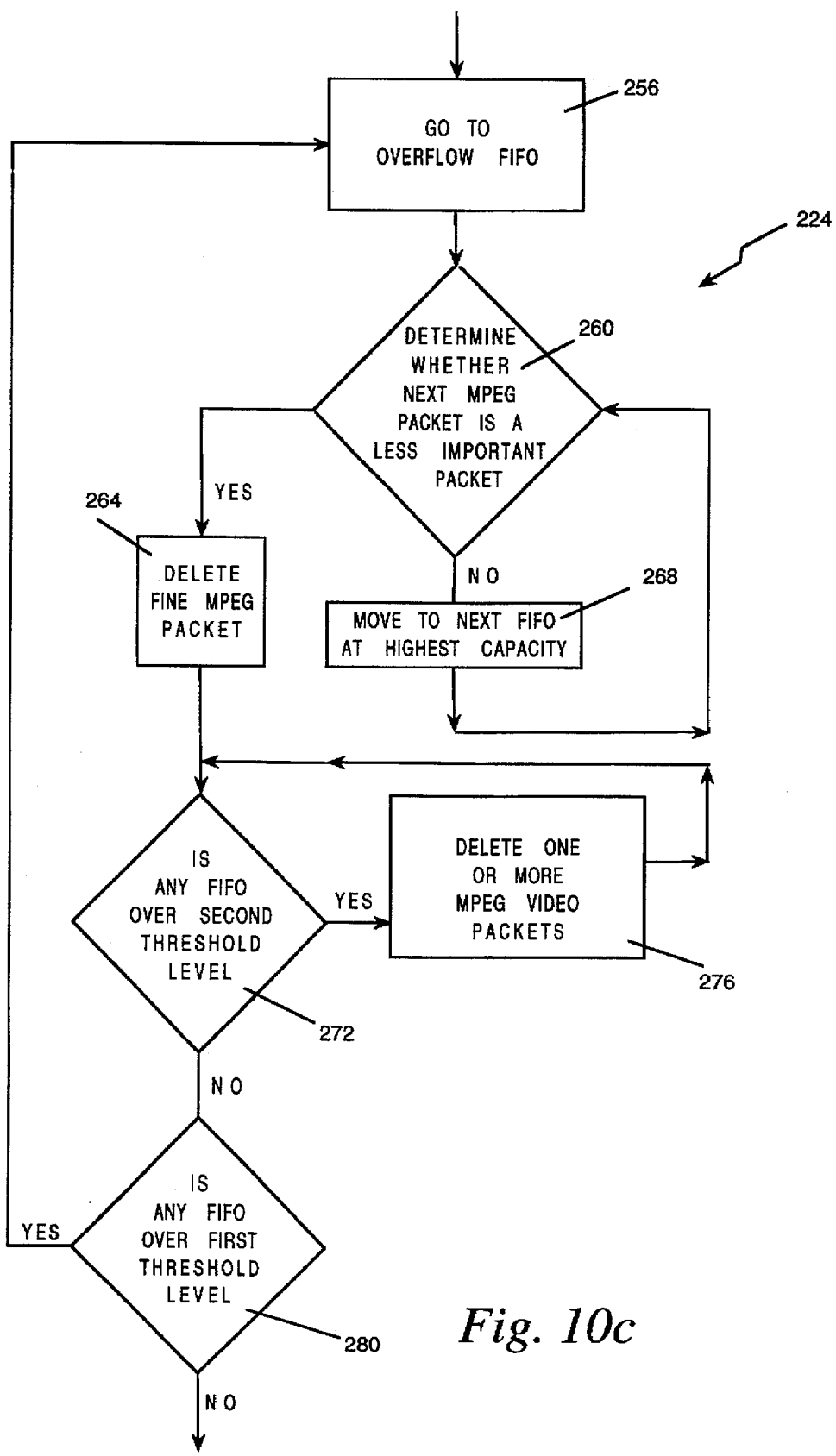

FIG. 10b is an example of the software flow for the controlling of the output gates (block 228). The Control CPU 90 receives specific information on the level of data in each FIFO 156 (function block 236). It checks each FIFO 156 to determine the percentage of the FIFO's 156 capacity that has been filled (block 240). Following this check, the Control CPU 90 determines the priority of each FIFO 156 for sequencing, 244.

A variety of analytical and statistical methods may be used to determine the priority of the FIFOs 156 for sequencing. Some factors which should be considered are whether the video feed to that FIFO 156 is considered a fast video feed and designated as such, how quickly the FIFO 156 is receiving additional information from its video feed, and whether that FIFO 156 has had video packets recently deleted.

The simplest method of determining priority would be to simply make the FIFO 156 with the least available capacity (remaining) the number one priority for sequencing. In this manner, FIFOs 156 would be sequenced in accordance with their levels. However, other information should be taken into account to more accurately prioritize the FIFOs 156 and receive better results from the Combiner 104. For example, the FIFOs 156 which are receiving "fast" video signals and in the recent sampling have received large quantities of video data, are more likely to require a higher priority than an equally filled FIFO 156 that is receiving "slow" video and recent sampling has shown that it is receiving data at a slow rate. With the proper prioritizing, most overflow conditions are avoided.

Following prioritization the Control CPU 90 steps to the next priority FIFO 156 (function block 248). At this time, the Control CPU 90 signals the appropriate FIFO 156 output gate to release the video/audio information, 252.

FIG. 10e shows a simple example of how the overflow condition may be handled with software at the Control CPU 90. This subroutine 224 must determine which packets of video/audio information are to be deleted and how many packets are to be deleted. Prior to exiting from this subroutine, the software must correct the overflow condition, as represented at function block 256. The first step in the subroutine is for the software to check the particular FIFO 156 that has triggered the overflow condition. The subroutine then determines whether the next MPEG video packet in that particular FIFO 156, the overflow FIFO 156, is a less important MPEG video packet (decision block 260). A less important video packet may be defined in many ways. However, timing and synchronization information is considered important in most instances. One example of a less important video packet is a one that contains fine detail about the video picture. A less important MPEG video packet provides video Information on the fine details of a moving picture.

If it is found that the next MPEG packet is a less important packet (e.g., fine), that less important packet may be deleted, block 264. If the next packet in the overflow FIFO 156 is not a less important packet, then the system moves on to the next FIFO 156, which is at the second highest level of capacity (block 268). The subroutine 224 now returns to check (block 260) this FIFO 156 to determine whether the next MPEG packet is a less important MPEG packet. This loop of checking each FIFO 156 for a less important packet continues until a less important packet is found or until the loop has checked each FIFO 156, whichever event occurs first.

Once the subroutine 224 has either found a packet to delete or cycled through all the FIFOs 156, it proceeds to another decision. The subroutine's 224 next decision is whether it is necessary to delete any additional packets. To make this decision, the subroutine 224 determines whether any of the FIFOs 156 are over a second threshold level that is set (e.g. 80 or 90% full), as at decision block 272. If there are FIFOs 156 that are over the second threshold level, then the subroutine 224 will delete an entire MPEG video packet (block 276) but it will not delete timing information. Preferably, the packet deleted is an MPEG video packet from the same FIFO 156 that the subroutine 224 has deleted the free packet. If the second threshold level is not reached, then the subroutine 224 checks whether the first threshold level is reached (block 280). If the first threshold level is still surpassed, then the subroutine 224 begins anew and looks for a FIFO 156 with a fine MPEG packet to be deleted.

A number of threshold levels may be checked with varying degrees of actions taken to avert overflow problems (e.g. 75%, 85%, 95%). The higher the threshold the more detrimental (or serious) the action taken by the subroutine 224 to prevent catastrophic signal disruption to the viewer.

Although this subroutine 224 can be performed in a variety of manners, it is preferred that those MPEG packets (block 276) having the least effect on the video are deleted first (less important). Therefore, synchronization signals would not be deleted. It is preferred that fine detail MPEG video packets of information are deleted first. Using the subroutine 224 shown, it is likely that the fine detail MPEG packets (block 276) on fast moving video would be the first packets to be deleted. These packets are the least likely to affect a subscriber's picture. Since it is a fast moving video picture, one MPEG packet providing free details on that picture is likely to go unnoticed to a viewer's eye. If larger, more important packets of information are required to be deleted, the viewer may notice a momentary pause in his video picture or a slight distortion in a subset of the screen. This will occur because new video to refresh the screen would be deleted and the next picture is delayed. Those skilled in the art will realize that many subroutines 224 which can control the overflow condition can be used.

ADVANCED EMBODIMENT

Figure 11:
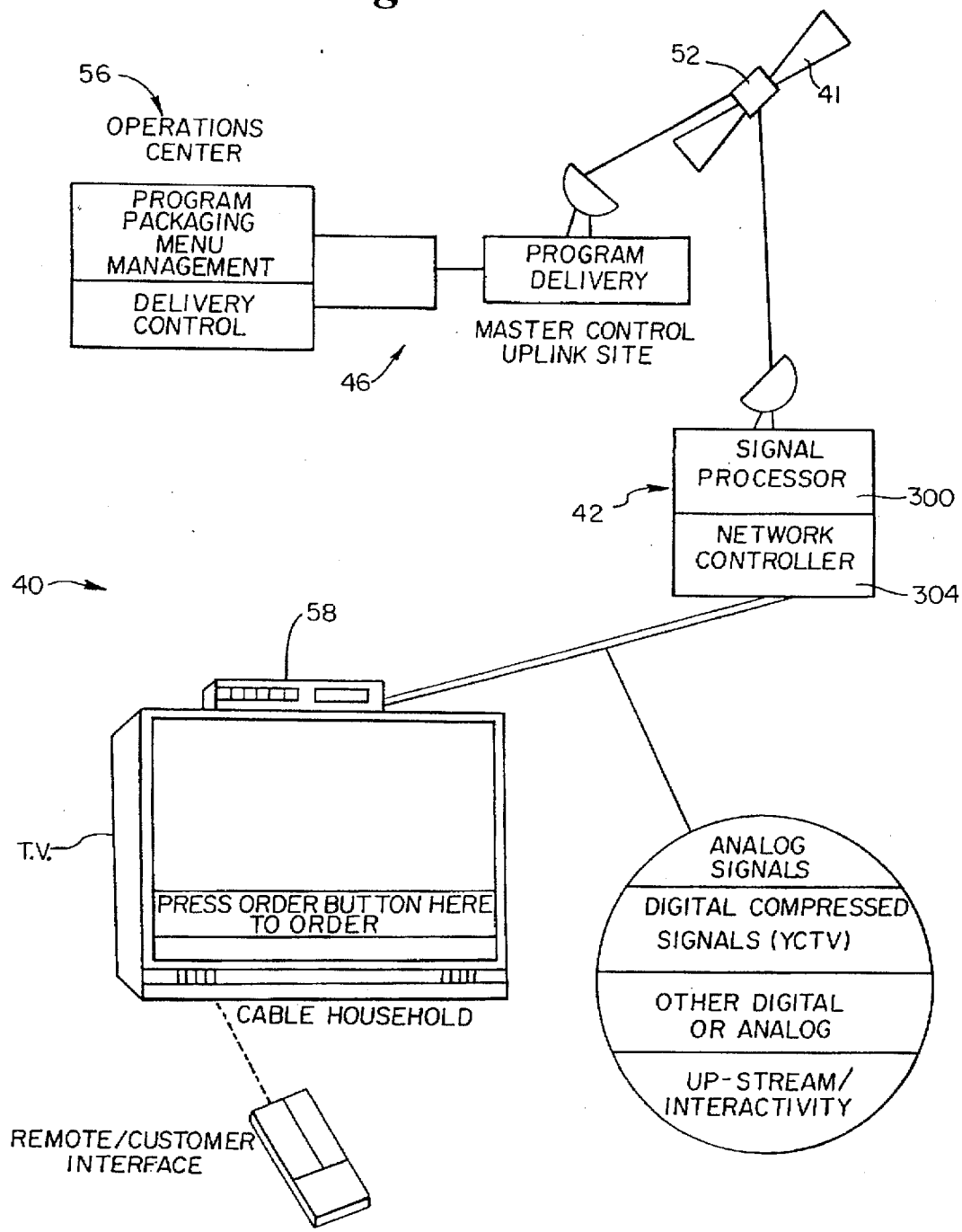
FIG. 11 is a schematic of a complex program delivery system for a digital cable headend with a set top terminal control information stream.
Figure 12:
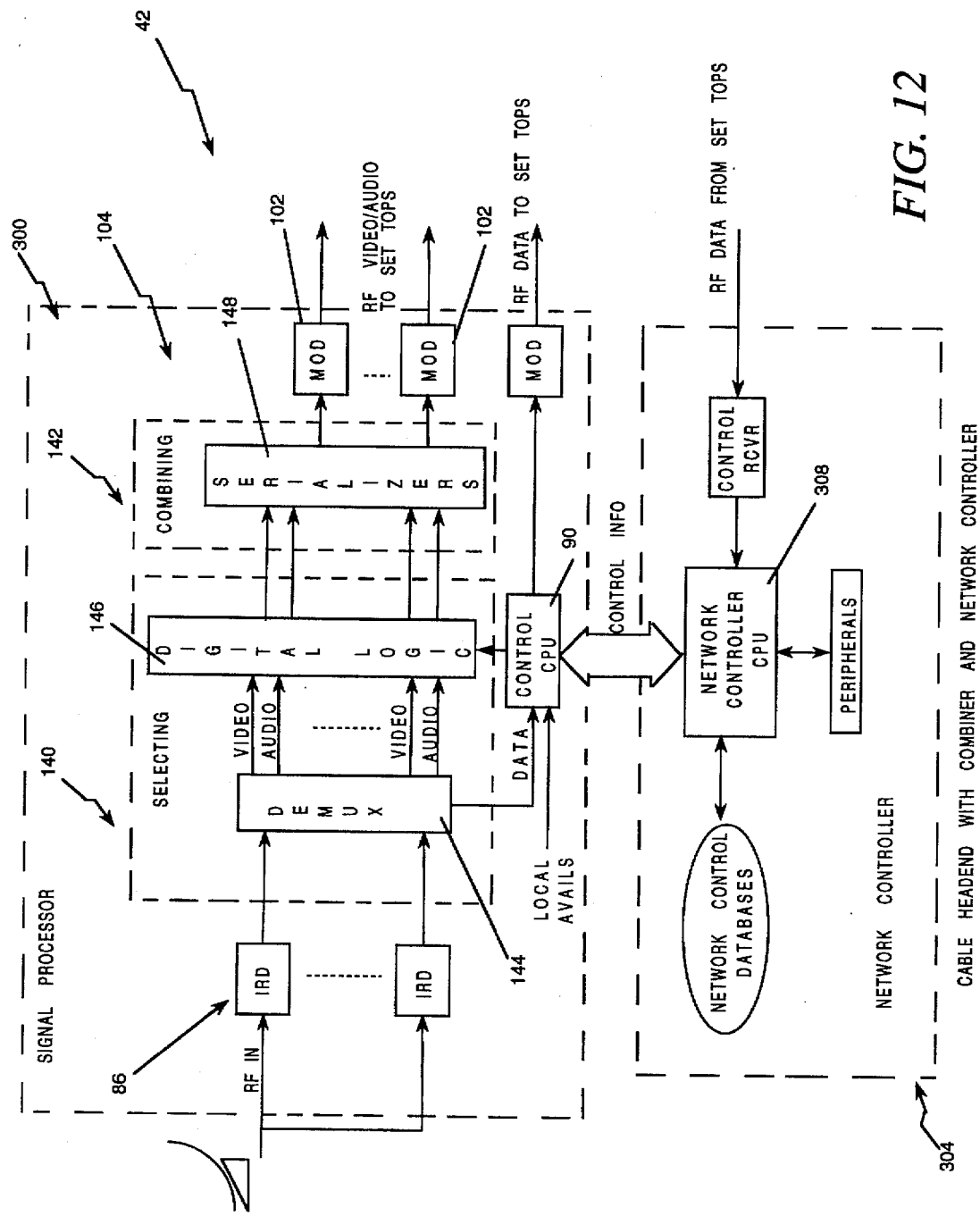
FIG. 12 is a schematic for one embodiment of a digital cable headend (including a Combiner and network controller) for the complex program delivery system shown in FIG. 11.

FIGS. 11 shows an overview of the operation of a more complex program delivery system 40. FIG. 12 is a schematic of the preferred embodiment of a digital cable headend 42 to support the more complex program delivery system 40. This embodiment incorporates the Combiner 104 in a more advanced cable delivery system which provides programming information and advanced television features to viewers. The headend 42 of this embodiment is shown in two parts a signal processor 300 and a network controller 304. The Combiner 104 is one part of the signal processor 300.

The Operations Center 56 shown, is a central site 200 which performs program packaging and delivery control. Program packaging involves the organization of programs and digital information about the television programs for use by the cable headend 42 and the viewers. In the preferred embodiment, the packaged program signal will be treated at a master control uplink site 46 prior to being transmitted to the satellite 41. Various satellite multi-accessing schemes and architectures can be used with the system, including both single channel per carrier (SCPC) frequency division multiplex (FDM) and multiple channel per carrier (MCPC) time division multiplexing (TDM). Time division multiplexing is the more desirable scheme. The signal is transmitted from the satellite 41 to the cable headend 42 where the signal is treated and delivered through cables to a subscriber's home. The Operations Center is described in detail in Patent application Ser. No. 08/160,282 entitled, OPERATIONS CENTER FOR A CABLE TELEVISION DELIVERY SYSTEM, filed on Dec. 2, 1993, by the same assignee and incorporated herein by reference.

The cable headend 42 receives the digitally compressed and multiplexed signal from the satellite 41 and processes the signal for further distribution to the subscriber homes. The cable headend 42 of this embodiment performs two primary functions in the cable delivery system. It will act as a signal processor 300 and distribution center for routing the digitally compressed signals to subscribers and it will act as a network controller 304 receiving information from subscribers and passing the information on to the Operations Center 56 or other remote sites (such as regional, statistical and billing sites not shown).

In order to perform these two functions, the cable headend 42 of the preferred embodiment is equipped with two computer processors working in unison. Use of two processors performing different functions increases the speed and capability of the cable headend 42 without a significant increase in cost. One processor, the Control CPU 90 in the signal processing system, handles the receiving, processing and combining of the satellite 41 signal for distribution to subscribers. The second processor acts as a network controller 304 and monitors activity of the subscriber's set top terminal 58. The cable headend 42 can be operated by one CPU or a series of CPU's which perform the Control CPU 90 and network control functions.

The signal processing system 300 will treat the signal as necessary for use by the subscriber's set top terminal 88. In the simplest embodiment, the amount of processing that is necessary by the signal processing system 300 is limited to demultiplexing and frequency allocation. However, in the preferred embodiment, the signal processing system 300 demultiplexes the signal, processes the signal through the Combiner 104, allocates frequencies and then re-multiplexes the signal using a different multiplexing scheme prior to the signal's distribution to the subscriber. In addition, for embodiments in which the control of local availability time is desired at the cable headend 42, the signal processing system 300 must be capable of compressing and adding additional signals to the satellite 41 signal.

In order to incorporate local programming, the signal processing system 300 would demultiplex the satellite 41 signal, compress the local programming, combine the compressed local program with the satellite 41 signal and then multiplex the signal prior to delivery to the subscriber terminals 58. Local programming in analog format may also be combined by the Combiner 104 as described earlier. Most of the activities necessary for incorporating local programming will be automatically performed by the signal processing system 300. In the preferred embodiment, the signal processing system 300 incorporates all the necessary digital switching capability to serve numerous subscribers and multiple concatenated cable systems 50, as shown in FIG. 2.

Although it is possible, it is preferred that the cable headend 42 does not perform any video decompression. Signals received by the cable headend 42 must be decompressed before transmission from headend 42 to subscriber location only when the compression algorithm used for the cable system differs from the one used for satellite transmission 41. Separate compression algorithms may be used to maintain desired signal quality and throughput over both of the transmission mediums. Also, digital compression is needed if the cable headend 42 operator wishes to transmit local analog signals to viewers in digital form. These analog signals received by the cable headend 42 require encoding before transmission to viewer homes (as shown earlier in FIGS. 4 and 5b).

In the preferred embodiment, two-way communications between the network controller 304 and set top terminal 58 will occur over cable lines. Interactive television programming can be accommodated through the network controller 304. In addition, the network controller 304 will be able to access set top terminals 58 via phone lines for trouble shooting, special features or sophisticated reprogramming.

To perform its functions, the network controller 304 must work closely with the signal processing system 300. In many instances the data signal (also called the program control information signal) received from the Operations Center 56 must be modified prior to being sent to the set top terminals. These modifications to the program control information are made by the network controller 304 working in conjunction with the signal processing system 300 to send a set top terminal 58 control information stream (STTCIS). From the signal processing system 300, the network controller 304 receives the program control information signal which includes cable franchise specific information added by the Operations Center 56. The network controller 304 modifies the program control information signal, if necessary, and communicates the new information to the signal processing system 300. The signal processing system 300 then forwards the information to the set top terminal 58 in the form of the STTCIS. In most instances the network controller 304 will modify the program control information signal by adding additional information. In a simple embodiment, the program control information signal can be passed through the cable headend 42 to the set top terminal 58 without any modifications.

Although the signal processing system 300 will handle the addition of simple local availabilities (e.g. local advertisements) into the signal sent to the set top terminal 58, the network controller 304 will handle any of the more sophisticated local programming needs such as interactive programming and certain data services. The network controller 304 will receive any electronic signals sent by the set top terminal 58 including those in response to interactive service requests and some data service requests. The network controller 304 coordinates the necessary switching and access to allow the subscriber to enjoy these services.

The network controller 304 has the capability of performing "on the fly programming" changes, assisting in masking portions of subscriber's television screens (split screen video), assisting in selecting different audio signals for the same video (foreign languages), assisting in interactive features, create tiered programming, etc. For last minute changes to programming (such as for a local emergency or important regional events), an operator using the network controller 304 can modify the program control information signal "on the fly" and change menus available to the subscriber. This accommodates short notice changes to program packaging that can not be provided to the Operations Center 56 in advance. In order to accommodate split screen techniques for promo and demo video, those undesired video portions of the screen must be masked. The network controller 304 can send the necessary control information to inform the set top terminal 58 to mask portions of a specific channel's video. For example, a video channel with a split screen showing four separate videos would require a ¾ mask to focus the viewer on the featured video clip. The network controller is described in detail in U.S. Patent application Ser. No. 08/160,280, entitled, NETWORK CONTROLLER FOR CABLE TELEVISION SYSTEMS, filed Dec. 2, 1993, by the same assignee and incorporated herein by reference.

A number of digital cable headend 42 embodiments have been shown. Those skilled in the art will appreciate that numerous variations to the designs shown are possible. Also, based on the examples shown, those skilled in the art will appreciate that a headend 42 may be configured in a variety of ways using a Combiner 104 as a component.

The terms and descriptions used herein are set forth by way of illustration only and are not meant as limitations. Those skilled in the art will recognize that numerous variations are possible within the spirit and scope of the invention as defined in the following claims.

What is claimed is:

1. A combiner for selecting digitized programs and for combining the selected programs to create a combined signal for distribution to program subscribers, for use in a television program delivery system headend wherein the combiner receives digital video signals containing a plurality of digitized programs and receives information on programs to be selected, the combiner comprising:

means for receiving the information, wherein the received information includes data on the identifies of the plurality of digitized programs to be selected for distribution to the program subscribers;

processor means for sending instructions comprising:
means for determining the identities of the plurality of digitized programs to be selected using the received information, and
means for generating instructions on the identities of the plurality of digitized programs to be selected;

means, connected to the processor means, for selecting any of the plurality of digitized programs based on instructions received from the processor means, the selecting means comprising:
means for demultiplexing the received digital video signals into component parts so that each of the plurality of digitized programs can be identified, each of the demultiplexed component parts containing at least one of the plurality of digitized programs; and
means for communicating identified digitized programs using the program identifies, wherein the program identities are determined by the processor means and sent to the communicating means in the instructions from the processor means;

means, connected to the selecting means, for combining the communicated programs into a combined signal.

2. The combiner of claim 1 wherein the program subscribers are distributed digitized programs and wherein the combiner further comprises:
a means for distributing the combined signal to the subscribers in the television program delivery system, the distributing means comprising:
digital modulator means for modulating the combined signal so that the digitized programs are transmitted to the program subscribers; and
a concatenated cable system for transporting the digitally modulated signal with digitized programs to the program subscriber.

3. The combiner of claim 1 capable of producing analog programs wherein the combining means further comprises a digital-to-analog converter for converting to communicated programs into analog program signals that represent the analog programs.

4. The combiner of claim 3 wherein the program subscribers are distributed the analog programs, and wherein the combining means further comprises analog modulators for modulating the analog programs into the combined signal for distribution to subscribers.

5. The combiner of claim 1 wherein analog video and audio programs are received, digitized and combined with the digitized programs, the combiner further comprising:

digital encoder means for digitizing analog video and audio into local digitized programs; and
means for communicating the local digitized programs to the combining means.

6. The combiner of claim 1 wherein analog video and audio programs are received, digitized and combined with the digitized programs, the combiner further comprising:
a digital encoder for digitizing the analog video and audio into local digitized programs; and
wherein the selecting means further comprises:
means for accepting the local digitized programs from the digital encoder;
means for identifying the local digitized programs for communication to the combining means by the communicating means, wherein the local digitized programs are identified by address packets.

7. The combiner of claim 1 wherein analog programs are distributed with the combined signal using a first carrier frequency and a second carrier frequency, the combiner further comprising:
a means for receiving the analog programs to be distributed with the combined signal; and
a means for distributing the combined signal to the subscribers in the television program delivery system, the distributing means comprising:
an analog modulator for modulating the received analog programs onto the first carrier frequency; and
a digital modulator for modulating the combined signal onto the second carrier frequency.

8. The combiner of claim 1 wherein the digitized programs are expressed in video data format having video data, the combiner further comprising:
means for error correcting the video data of the digitized programs.

9. The combiner of claim 1 wherein the digitized programs are received encrypted using one or more methods of encryption, the combiner further comprising:
decrypting means for removing one of the methods of encryption from the digitized programs prior to the combined signal distribution to subscribers.

10. The combiner of claim 1 further comprising:
means for encrypting the identified programs so that only authorized subscribers can decrypt the programs after distribution.

11. The combiner of claim 1 wherein the information on digitized programs to be selected is received with the digital video signals, and wherein the means for receiving information on the digitized programs comprises:
an information data demultiplexer for extracting a data signal containing the information on digitized programs to be selected; and
means for transferring the data signal from the information data demultiplexer to the processor.

12. The combiner of claim 1 wherein the means for receiving the information on digitized programs to be selected comprises:
terminal means for manually entering information on digitized programs to be selected; and
means for forwarding the entered information on digitized programs from the terminal to the processor.

13. The combiner of claim 1 wherein a data signal containing the information on digitized programs to be selected is transmitted from a remote site and wherein the means for receiving the information on programs to be selected comprises:

modem means for acquiring the data signal containing the information on digitized programs to be selected; and means for delivering the data signal to the processor.

14. The combiner of claim 1 wherein the communicating means further comprises:

means for obtaining the digitized programs from the demultiplexing means;

means for accepting the instructions from the processor;

configuration means for interpreting the instructions received from the processor and providing program identifying data; and logic means for receiving program identifying data and enabling the identified digitized programs to be communicated to the combining means.

15. The combiner of claim 1 wherein the combining means further comprises a plurality of first-in-first-out queuing means for temporarily storing portions of the communicated programs; and wherein the selecting means comprises a control means for sending control information to the plurality of first-in-first-out queuing means.

16. The combiner of claim 1 wherein the combining means comprises a plurality of output gates controlled by the processor for output of communicated programs.

17. The combiner of claim 1 wherein the digitized programs are expressed by a series of video data packets and wherein the communicating means communicates video data packets to the combining means, and wherein the combining means further comprises:

serializer means for placing the video data packets in a serial order.

18. The combiner of claim 17 wherein the processor further comprises:

means for prioritizing the communicated video data packets by importance; and means for controlling the order of the communicated video data packet flow in the combiner using the prioritization established by the prioritizing means.

19. The combiner of claim 17 wherein communicated video data packets are discarded by the combiner to limit disruption of video reception by the subscribers, the processor further comprising:

means for determining which communicated video data packets to be discarded.

20. A method for selecting and combining digitized programs to create a combined signal for distribution to program subscribers, for use in a television program delivery system headend wherein a combiner receives digital video signals containing a plurality of digitized programs and receives information on programs to be selected, comprising the steps of:

receiving the information on programs to be selected for distribution to the program subscribers;

sending instructions comprising the steps of:
determining identities of digitized programs to be selected using the received information; and
generating instructions on the identities of the digitized programs to be selected;

selecting digitized programs comprising the steps of:
demultiplexing the received digital video signals into component parts each of the component parts containing one of the plurality of digitized programs; and
communicating identified digitized programs using the program identities received in instructions from the processing step;

combining the communicated programs into a combined signal comprising receiving the communicated programs; and distributing the combined signal to the subscribers.

21. A cable headend for cable television program delivery systems which deliver a plurality of program signals each containing a plurality of digital video programs expressed in digital format comprising:

means for receiving a plurality of program signals each containing a plurality of digital video programs expressed in digital format;

demodulator means, connected to the receiving means, for demodulating the plurality of program signals;

demultiplexer means, connected to the demodulator, for demultiplexing the demodulated program signals into the plurality of digital video programs;

means for selecting among the plurality of digital video programs;

means, coupled to the selecting means, for combining the selected video programs to form a combined signal;

means for modulating the combined signal for distribution to cable subscribers; and transmitter means for transmitting the modulated signal to one or more concatenated cable systems.

22. The cable headend of claim 21, wherein the cable headend receives analog programs from a remote source, and wherein the means for combining the selected video programs further comprises a means for combining analog program signals with the selected video programs, the cable headend further comprising:

means for receiving one or more analog program signals; and means for choosing one or more analog program signals to be combined with the selected digitized video signals.

23. The cable headend of claim 21, wherein the means for receiving a plurality of program signals is also capable of receiving analog program signals, the cable headend further comprising:

means for converting analog program signals into digital video signals comprising:

means for digitizing and compressing the analog program signal.

24. The cable headend of claim 21 wherein the means for combining further comprises:

a plurality of storage means for temporarily storing the selected video program before combining the selected video programs wherein each storage means temporarily stores a portion of one selected video program at a time; and means for accessing each of the plurality of storage means by switching from one storage means to another storage means for assisting in combining stored portions of video program into the combined signal.

25. The cable headend of claim 21 wherein the means for selecting among a plurality of digital video programs comprises:

information processing means for identifying digital video programs to be selected.

26. The cable headend of claim 21 wherein the digital video programs are grouped into a plurality of sets and some subscribers are not authorized to receive a first set of video programs, and wherein the selecting means comprises a means for simultaneously selecting a first set of digital video programs and selecting a second set of digital video programs, and wherein the combining means comprises means for combining the first set of selected digital video programs and the second set of selected video programs for distribution to cable subscribers.

27. The cable headend of claim 21 further comprising:

means for decrypting and encrypting the video programs, wherein the decryption and encryption means is connected to the combining means.

* * * * *

UNITED STATES PATENT AND TRADEMARK OFFICE
CERTIFICATE OF CORRECTION

PATENT NO. : 5,682,195

DATED : October 28, 1997

INVENTOR(S) : John S. HENDRICKS, et al.

It is certified that error appears in the above-indentified patent and that said Letters Patent is hereby corrected as shown below:

Column 1, line 14: replace "fried" with --filed--
Column 7, line 32: replace "upIink" with --uplink"--
Column 11, line 14: replace "demultipIexer" with --demultiplexer--
Column 11, line 51: replace "Information" with --information--
Column 12, line 63: replace "2" with --2--
Column 14, line 33: replace "remotely" with --remotely--
Column 16, line 29: replace "Is" with --is--
Column 17, line 52: replace "dam" with --data--
Column 19, line 30: replace "10e" with --10c--
Column 19, line 47: replace "Information" with --information--
Claim 1, col. 23, line 16: replace "identifies" with --identities--
Claim 1, col. 23, line 37: replace "identifies" with --identities--
Claim 3, col. 23, line 57: replace "to" with --the--

Signed and Sealed this

Twenty-ninth Day of September, 1998

Attest:

BRUCE LEHMAN

Attesting Officer

Commissioner of Patents and Trademarks